US012548930B2

(12) United States Patent
Tsukamoto et al.

(10) Patent No.: US 12,548,930 B2
(45) Date of Patent: Feb. 10, 2026

(54) ELECTRICAL CONNECTOR AND ELECTRICAL CONNECTOR SET PROVIDED WITH THE ELECTRICAL CONNECTOR

(71) Applicant: Murata Manufacturing Co., Ltd., Kyoto-fu (JP)

(72) Inventors: Hideki Tsukamoto, Nagaokakyo (JP); Yuma Amemori, Nagaokakyo (JP); Yuuto Morita, Nagaokakyo (JP); Hiroyuki Hoshiba, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 310 days.

(21) Appl. No.: 18/333,398

(22) Filed: Jun. 12, 2023

(65) Prior Publication Data

US 2023/0327352 A1 Oct. 12, 2023

Related U.S. Application Data

(63) Continuation of application No. PCT/JP2021/036965, filed on Oct. 6, 2021.

(30) Foreign Application Priority Data

Dec. 23, 2020 (JP) ................................ 2020-214075

(51) Int. Cl.
*H01R 12/71* (2011.01)
*H01R 13/05* (2006.01)
(Continued)

(52) U.S. Cl.
CPC ........... *H01R 12/716* (2013.01); *H01R 13/05* (2013.01); *H01R 13/50* (2013.01); *H01R 12/57* (2013.01); *H01R 13/03* (2013.01)

(58) Field of Classification Search
CPC ...... H01R 12/716; H01R 13/05; H01R 13/50; H01R 12/57; H01R 13/03; H01R 13/6594; H01R 13/658
See application file for complete search history.

(56) References Cited

U.S. PATENT DOCUMENTS

| | | | | |
|---|---|---|---|---|
| 7,494,378 B1 * | 2/2009 | Peng | ...................... | H01R 12/73 439/607.01 |
| 9,225,086 B2 * | 12/2015 | Takeuchi | ............. | H01R 12/716 |

(Continued)

FOREIGN PATENT DOCUMENTS

| | | |
|---|---|---|
| CN | 209045920 U | 6/2019 |
| JP | 2012-252785 A | 12/2012 |

(Continued)

OTHER PUBLICATIONS

International Search Report issued in PCT/JP2021/036965; mailed Dec. 14, 2021.

*Primary Examiner* — Abdullah A Riyami
*Assistant Examiner* — Nelson R. Burgos-Guntin
(74) *Attorney, Agent, or Firm* — Studebaker Brackett PLLC

(57) ABSTRACT

An electrical connector which suppresses radiation noise at a high frequency from an inner terminal, and an electrical connector set provided with the electrical connector. An electrical connector includes an inner terminal; an outer terminal surrounding the inner terminal; and a holding member that has electrically insulating properties, extends in the long-side direction and the short-side direction, and is configured to hold the inner terminal and the outer terminal. The holding member has a first surface located on the first side that is the side facing a mounting circuit board, a second surface located on the second side opposite from the first side, and an inner side surface and an outer side surface connecting the first surface to the second surface. The outer (Continued)

terminal includes a first part extending along the first surface, and an inner part connected to the first part and extending along the inner side surface.

20 Claims, 22 Drawing Sheets

(51) Int. Cl.

| | |
|---|---|
| ***H01R 13/50*** | (2006.01) |
| *H01R 12/57* | (2011.01) |
| *H01R 13/03* | (2006.01) |

(56) References Cited

U.S. PATENT DOCUMENTS

| | | | | |
|---|---|---|---|---|
| 2012/0129398 | A1 | 5/2012 | Droesbeke | |
| 2018/0205165 | A1* | 7/2018 | Hoshiba ............... | H01R 12/716 |
| 2019/0280409 | A1* | 9/2019 | Hoshiba ............... | H01R 12/716 |
| 2020/0212635 | A1 | 7/2020 | Chen | |
| 2022/0094110 | A1* | 3/2022 | Okubo ................. | H01R 13/652 |
| 2022/0140534 | A1* | 5/2022 | Hoshiba ............. | H01R 13/6461 439/74 |

FOREIGN PATENT DOCUMENTS

| | | | |
|---|---|---|---|
| JP | 2016-012553 | A | 1/2016 |
| JP | 6145529 | B2 | 6/2017 |
| JP | 2019-197719 | A | 11/2019 |
| WO | 2020/039666 | A1 | 2/2020 |
| WO | 2020/218385 | A1 | 10/2020 |

* cited by examiner

ELECTRICAL CONNECTOR AND ELECTRICAL CONNECTOR SET PROVIDED WITH THE ELECTRICAL CONNECTOR

CROSS-REFERENCE TO RELATED APPLICATIONS

This application claims benefit of priority to International Patent Application No. PCT/JP2021/036965, filed Oct. 6, 2021, and to Japanese Patent Application No. 2020-214075, filed Dec. 23, 2020, the entire contents of each are incorporated herein by reference.

BACKGROUND

Technical Field

The present disclosure relates to an electrical connector and an electrical connector set provided with the electrical connector.

Background Art

For example, International Publication No. WO2020/218385 discloses an electrical connector including an inner terminal, an outer terminal surrounding the inner terminal, and an electrically insulating holding member which holds the inner terminal and the outer terminal.

SUMMARY

The outer terminal of the electrical connector in International Publication No. WO2020/218385 has a first part connected to a ground, an outer part connected to the first part, a second part located on the opposite side from the first part and connected to the outer part, and an inner part connected to the second part. The inner part is located at the farthest from the ground. In the outer terminal which deals with a high-frequency signal, the first part connected to the ground has the lowest electric potential, and an electric potential increases in the order of the outer part, the second part, and the inner part. By such difference in the electric potential, an electric field from the inner part toward the outer part is caused in the outer terminal. On the other hand, from the inner terminal, a high-frequency radiation noise is radiated from an inner side portion toward an outer side portion. When a direction of the electric field caused in the outer terminal matches the direction of the high-frequency radiation noise from the inner terminal, the high-frequency radiation noise is considered to be promoted. There is a demand for further suppressing the high-frequency radiation noise.

In this respect, the present disclosure provides an electrical connector which suppresses radiation noise at a high frequency from an inner terminal and an electrical connector set provided with the electrical connector.

An electrical connector according to an aspect of the present disclosure includes an inner terminal; an outer terminal surrounding the inner terminal; and a holding member that has electrically insulating properties, extends in a long-side direction and a short-side direction, and is configured to hold the inner terminal and the outer terminal. The holding member has a first surface located on a first side that is a side facing a mounting circuit board, a second surface located on a second side opposite from the first side, and an inner side surface and an outer side surface connecting the first surface to the second surface. The outer terminal includes a first part extending along the first surface, and an inner part connected to the first part and extending along the inner side surface.

According to the present disclosure, at least an electric field which promotes the high-frequency radiation noise is not caused from the outer terminal. Therefore, the high-frequency radiation noise from the inner terminal can be suppressed.

DETAILED DESCRIPTION

Hereinafter, embodiments of an electrical connector 10 and an electrical connector set 1 provided with the electrical connector 10 according to the present disclosure are described with reference to the drawings. Note that, in each drawing, an X-axis, a Y-axis, and a Z-axis orthogonal to each other are illustrated for convenience. Herein a long-side direction, a short-side direction, and an insertion direction of the electrical connector 10 are defined by the X-axis, the Y-axis, and the Z-axis, respectively.

[Electrical Connector Set]

Figure 1:
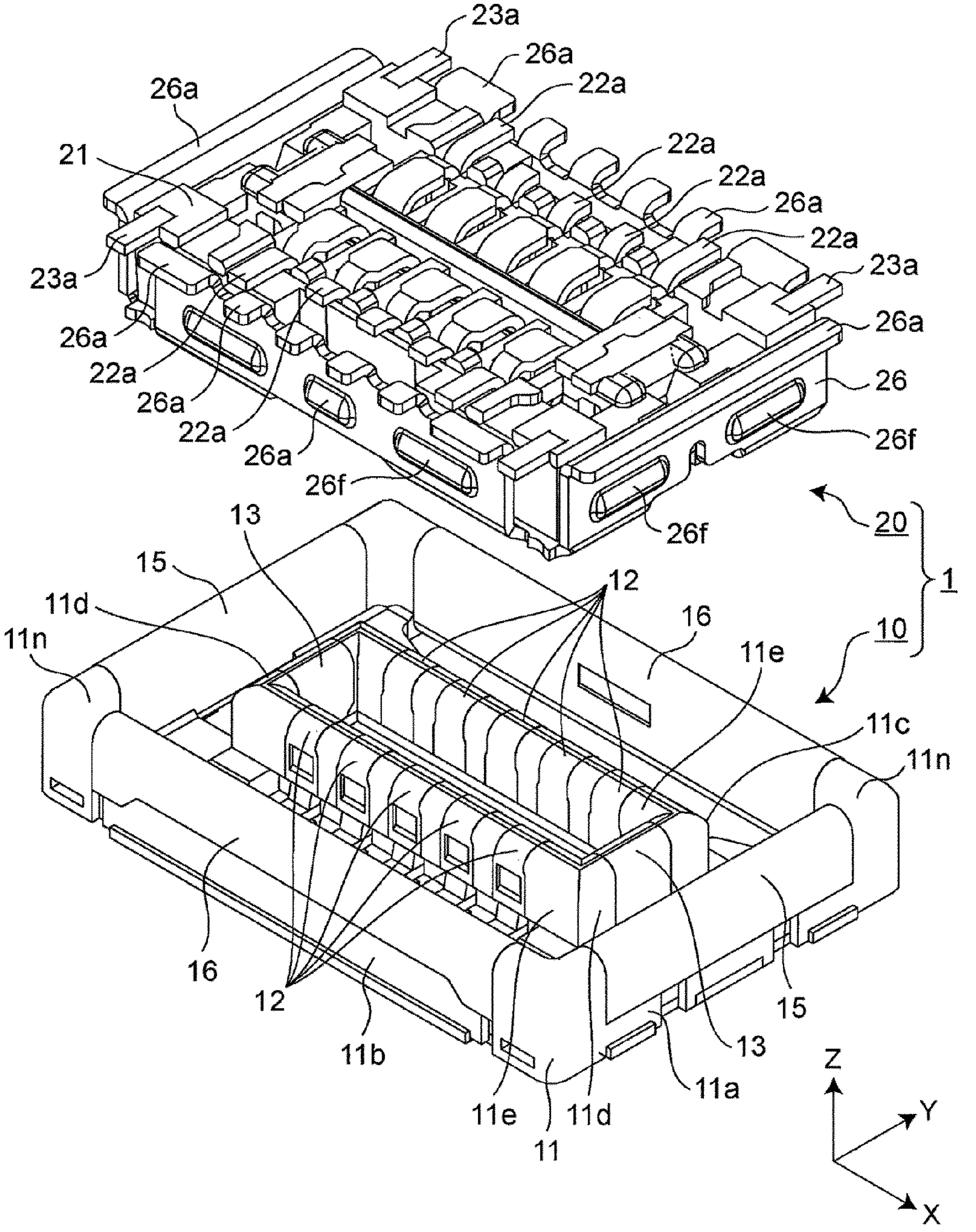
FIG. 1 is a perspective view illustrating an unmated state of an electrical connector set according to a first embodiment.
Figure 2:
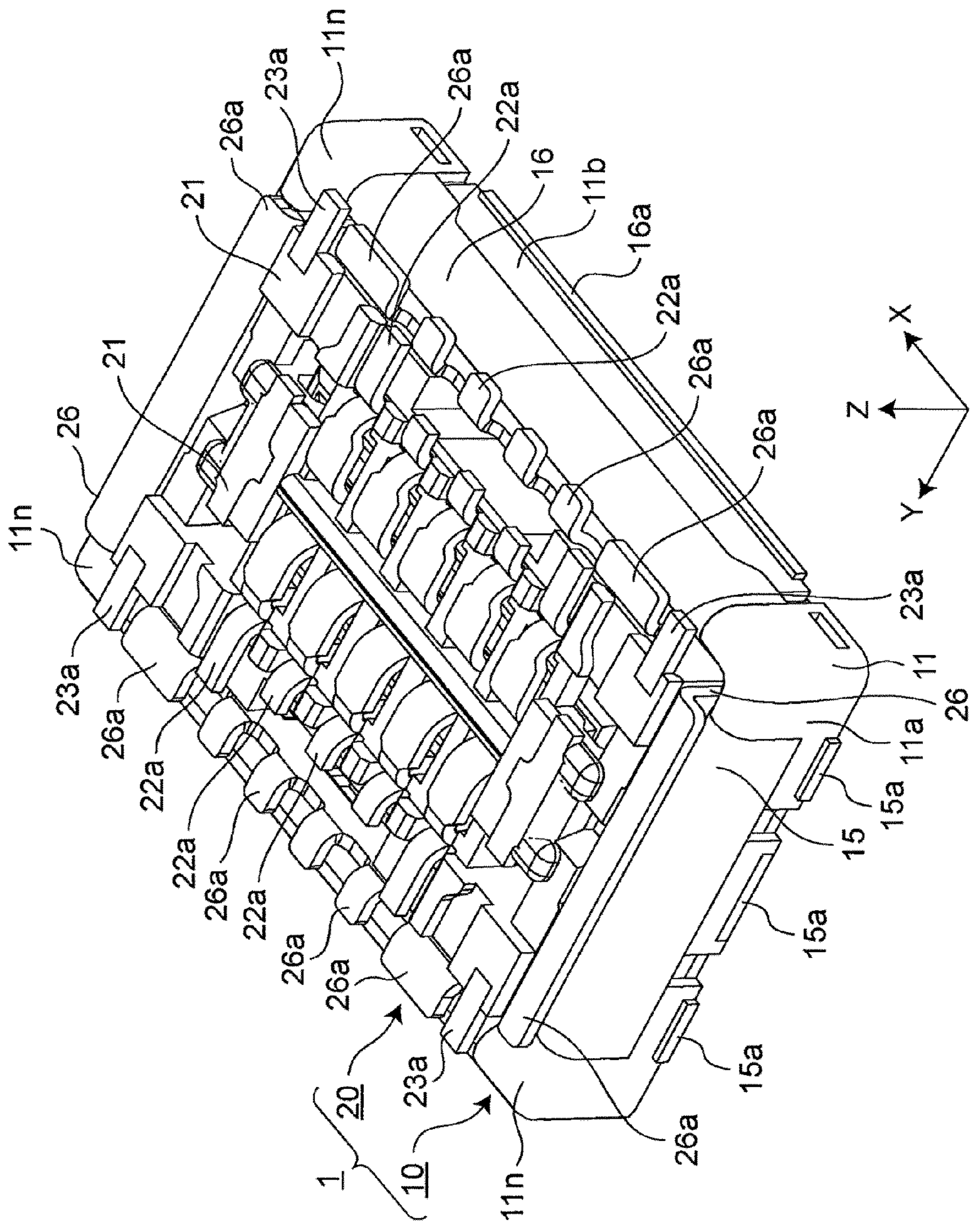
FIG. 2 is a perspective view illustrating a mated state of the electrical connector set illustrated in FIG. 1.
Figure 3:
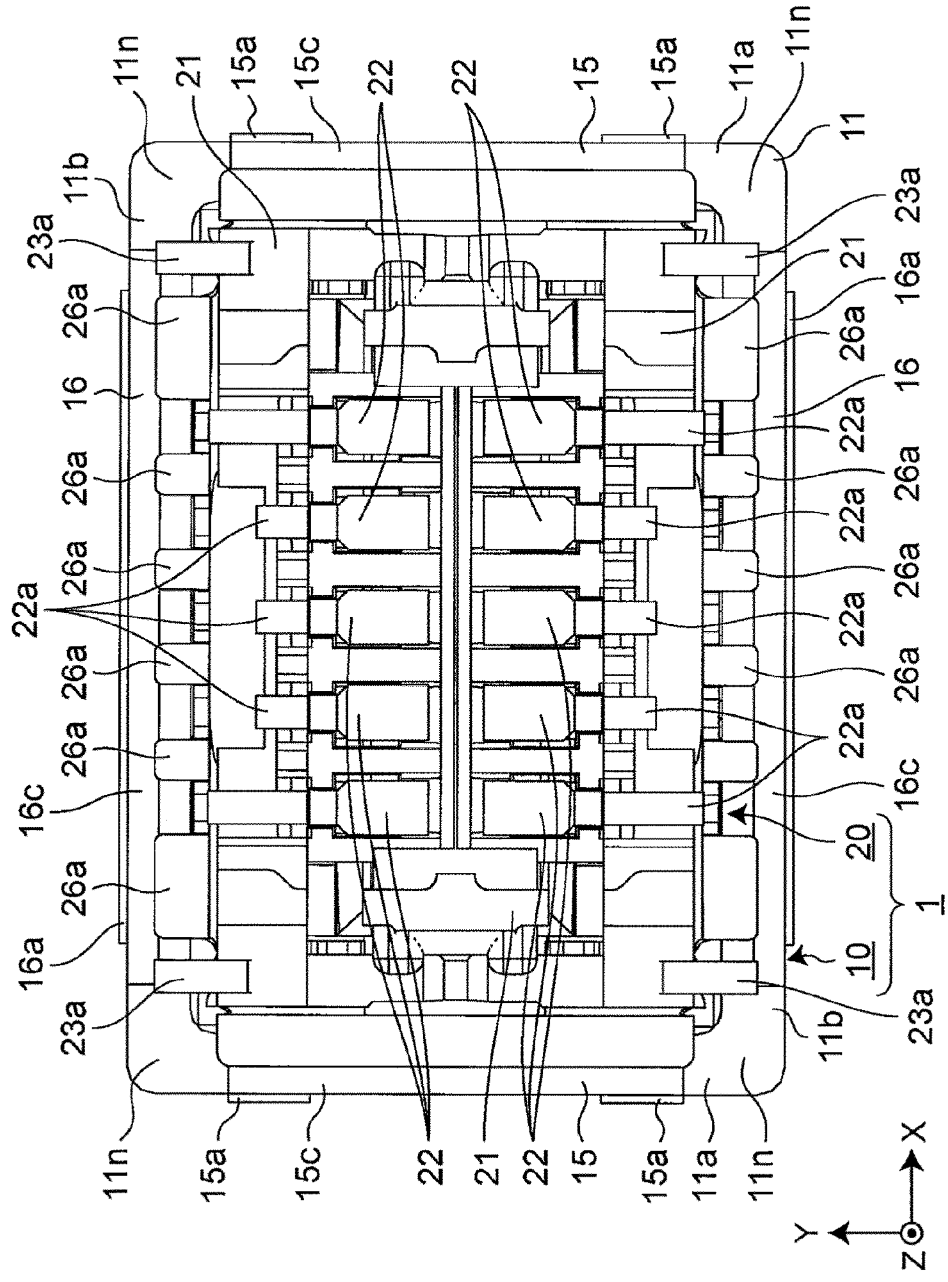
FIG. 3 is a plan view of the electrical connector set illustrated in FIG. 2.

FIG. 1 is a perspective view illustrating an unmated state of the electrical connector set 1 according to a first embodiment. FIG. 2 is a perspective view illustrating a mated state of the electrical connector set 1 illustrated in FIG. 1. FIG. 3 is a plan view of the electrical connector set 1 illustrated in FIG. 2.

As illustrated in FIGS. 1 to 3, the electrical connector set 1 includes the electrical connector 10 of a female type, and an electrical connector 20 of a male type which is insertably and removably mated with the female-type electrical connector 10 in the insertion direction (Z-axis direction). The electrical connector set 1 is configured such that, by the male-type electrical connector 20 being moved toward the female-type electrical connector 10 in the insertion direction (Z-axis direction) while the male-type electrical connector 20 is opposed to the female-type electrical connector 10, the female-type electrical connector 10 and the male-type electrical connector 20 are mated with each other. Note that, in the electrical connector set 1 disclosed herein, the overall size of the male-type electrical connector 20 is smaller than the overall size of the female-type electrical connector 10, and therefore, the male-type electrical connector 20 is fitted into the female-type electrical connector 10 to be accommodated therein.

[Male-Type Electrical Connector]

Figure 4:
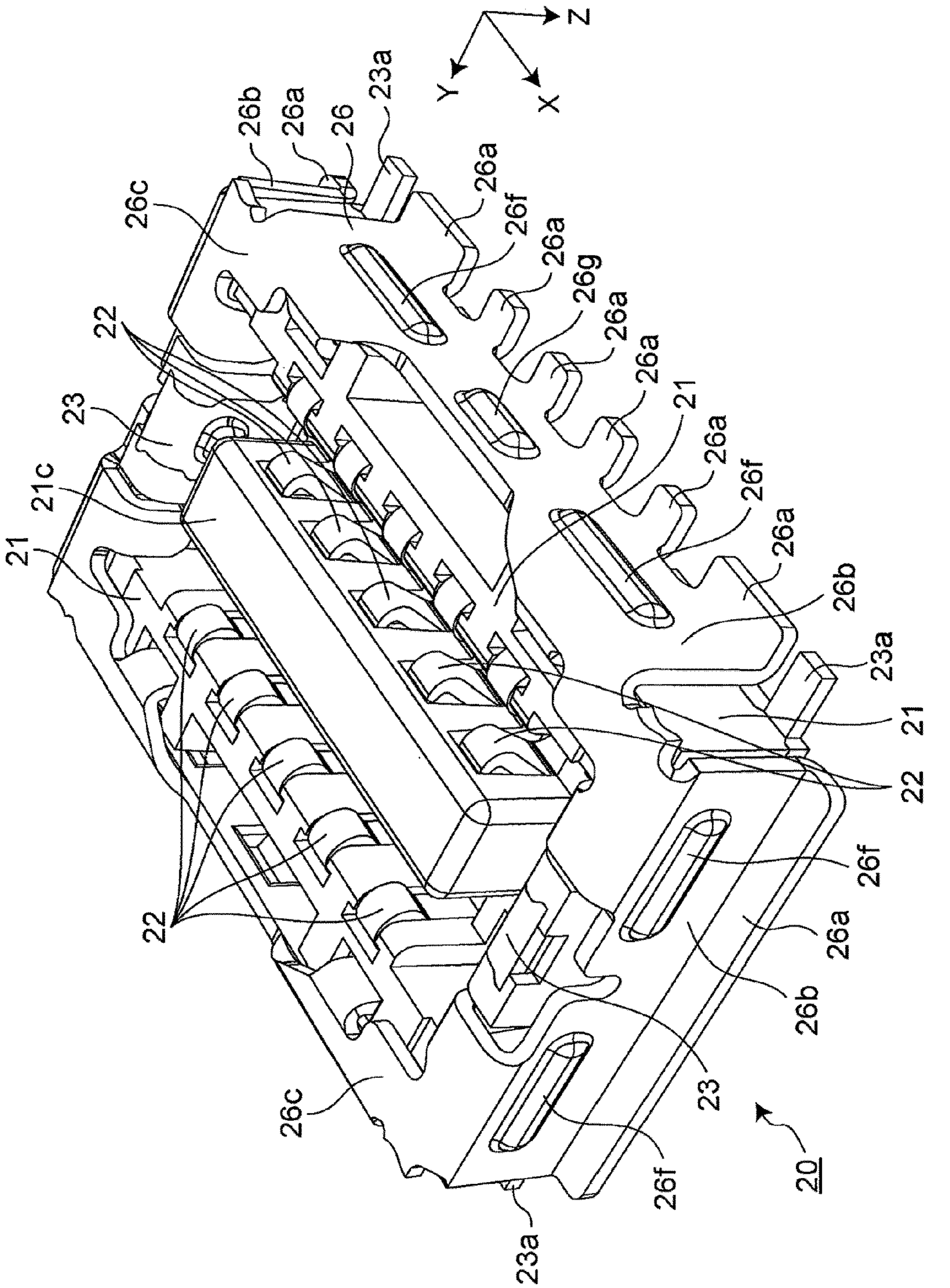
FIG. 4 is a perspective view of a male-type electrical connector which constitutes the electrical connector set illustrated in FIG. 1.
Figure 5:
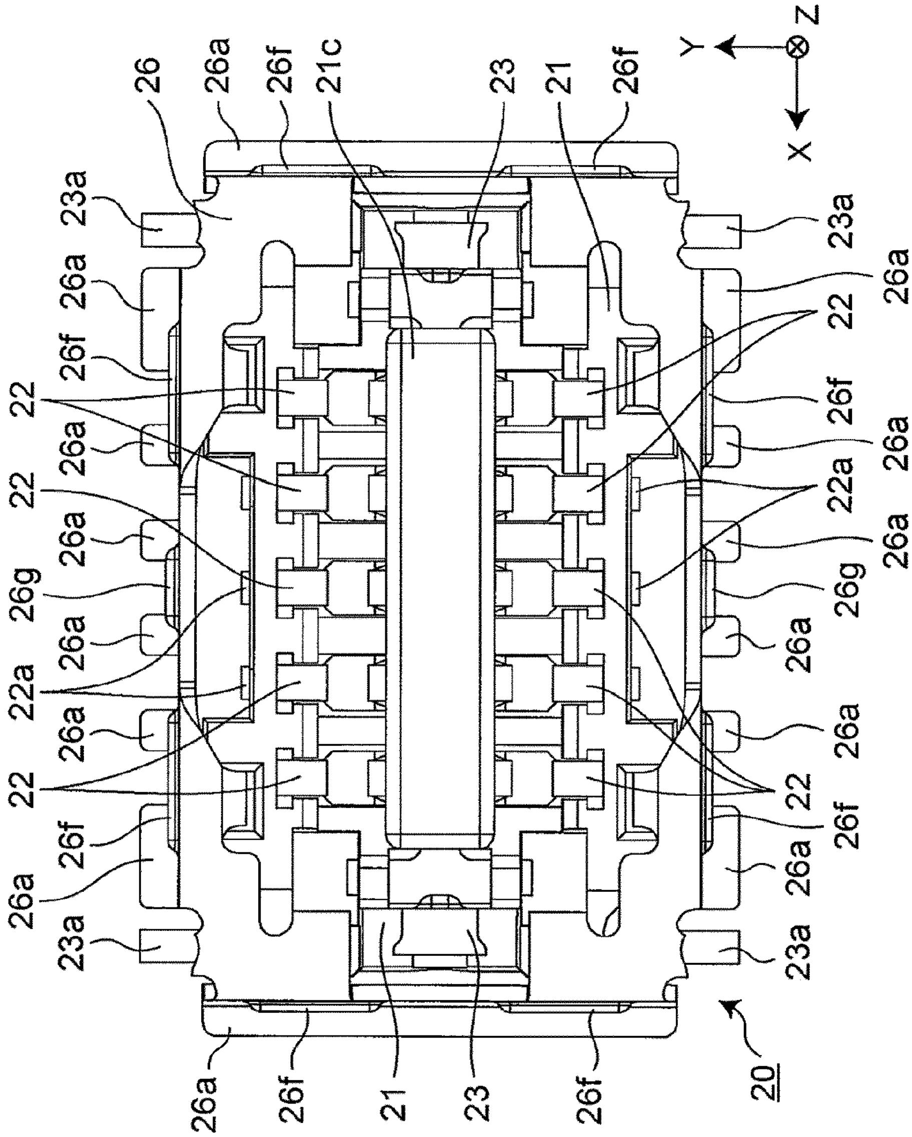
FIG. 5 is a plan view of the male-type electrical connector illustrated in FIG. 4.

The male-type electrical connector 20 is described with reference to FIGS. 4 and 5. FIG. 4 is a perspective view of the male-type electrical connector 20 which constitutes the electrical connector set 1 illustrated in FIG. 1. FIG. 5 is a plan view of the male-type electrical connector 20 illustrated in FIG. 4.

The male-type electrical connector 20 includes a holding member 21, an inner terminal (that is, a plurality of long-side inner terminals 22 and short-side inner terminals 23), and an outer terminal 26.

The holding member 21 extends in the long-side direction (X-axis direction) and in the short-side direction (Y-axis direction) of the male-type electrical connector 20. The holding member 21 has a middle holding part 21*c*, a peripheral wall part, and an accommodating recess formed between the middle holding part 21*c* and the peripheral wall part. As the holding member 21, for example, an electrically insulating resin such as liquid crystal polymer is used.

The middle holding part 21*c* and the peripheral wall part of the holding member 21 have, in the long-side direction (X-axis direction), a plurality of long-side attachment parts each in a recessed shape. The plurality of long-side inner terminals 22 are held by being attached to the long-side attachment parts. The plurality of long-side inner terminals 22 are aligned in the long-side direction (X-axis direction) of the male-type electrical connector 20. The long-side inner terminal 22 corresponds one-to-one with a long-side inner terminal 12 (described later). In the electrical connector set 1 in a mated state, the long-side inner terminal 22 establishes electrical connection while being engaged with the corresponding long-side inner terminal 12.

The long-side inner terminal 22 is, for example, a conductor connected to a signal potential or a ground potential, and is configured by a stick-like member having conductivity being bent. For example, phosphor bronze may be used as the long-side inner terminal 22. Phosphor bronze is elastically deformable material having conductivity. For example, gold plating or the like may be applied to a surface of the long-side inner terminal 22. The long-side inner terminal 22 extends in the short-side direction (Y-axis direction). The long-side inner terminal 22 includes a long-side mounted part 22*a* to be mounted on a land electrode of a circuit board (not illustrated). The long-side mounted part 22*a* is formed at a side end in the short-side direction (Y-axis direction) and at a lower end in the insertion direction (Z-axis direction).

The peripheral wall part of the holding member 21 has, in the short-side direction (Y-axis direction), a short-side attachment part in a recessed shape. The short-side inner terminal 23 is held by being attached to the short-side attachment part. The short-side inner terminal 23 is disposed to be opposed to a short side of the middle holding part 21*c*. The short-side inner terminal 23 corresponds one-to-one with a short-side inner terminal 13 (described later). In the electrical connector set 1 in the mated state, the short-side inner terminal 23 establishes electrical connection while being engaged with the corresponding short-side inner terminal 13.

The short-side inner terminal 23 is a conductor connected to a signal potential, and is configured by a stick-like member having conductivity being bent. For example, phosphor bronze may be used as the short-side inner terminal 23. Phosphor bronze is elastically deformable material having conductivity. For example, gold plating or the like may be applied to a surface of the short-side inner terminal 23. The short-side inner terminal 23 has a protrusion protruding inwardly. The protrusion of the short-side inner terminal 23 comes into contact with a side surface of the short-side inner terminal 13 (described later) in the mated state of the electrical connector set 1. Therefore, the short-side inner terminal 23 is electrically connected to the short-side inner terminal 13. The short-side inner terminal 23 includes a short-side mounted part 23*a* to be mounted on a land electrode of the circuit board (not illustrated). The short-side inner terminal 23 extends in the long-side direction (X-axis direction). The short-side mounted part 23*a* is formed at a side end in the short-side direction (Y-axis direction) and at a lower end in the insertion direction (Z-axis direction). A terminal width of the short-side inner terminal 23 is larger than a terminal width of the long-side inner terminal 22. Therefore, conductor loss at a high frequency can be reduced. In the short-side inner terminal 23, a signal at a frequency higher than a signal which flows in the long-side inner terminal 22 flows, and for example, a high-frequency signal at or higher than 5 GHz flows.

The outer terminal 26 has a rectangular frame-like shape which is circumferentially closed so as to surround the plurality of long-side inner terminals 22 and short-side inner terminals 23 when seen in the insertion direction (Z-axis direction). That is, in the outer terminal 26 having the rectangular frame-like shape, a long side extends in the long-side direction (X-axis direction), and a short side extends in the short-side direction (Y-axis direction). Here, the term "circumferentially" is unnecessarily limited to a polygonal circumference, and may be, for example, a circular circumference, an ellipse circumference, or a shape combining a polygonal circumference and a circular circumference.

The outer terminal 26 is held by being attached to the peripheral wall part of the holding member 21. The outer terminal 26 includes an outer mounted part 26*a*, an outer part 26*b*, and an upper part 26*c*. The outer mounted part 26*a* is used to be mounted on a ground electrode of the circuit board (not illustrated), and is formed at a lower end in the insertion direction (Z-axis direction).

The outer part 26*b* of the outer terminal 26 includes a plurality of electrical connection parts 26*f* each having a protruding shape and extending in the short-side direction (Y-axis direction) or the long-side direction (X-axis direction). The electrical connection part 26*f* comes into contact with a short-side inner part 15*b* of a short-side outer terminal 15 or a long-side inner part 16*b* of a long-side outer terminal 16 (described later) in the mated state of the electrical connector set 1. Therefore, the outer terminal 26 is electrically connected to the short-side outer terminal 15 or the long-side outer terminal 16. The long-side outer part 26*b* has, for example, a protruding part 26*g* provided between two electrical connection parts 26*f*. The protruding part 26*g* serves as a mating part which is mated with a recess 16*g* of the long-side outer terminal 16 (described later).

The outer terminal 26 is a conductor connected to a ground potential. The outer terminal 26 is connected to the ground potential so that it blocks an electromagnetic wave from outside and unwanted radiation from the long-side inner terminal 22 and makes a space surrounded by the outer terminal 26 be an electromagnetically shielded space. That is, the outer terminal 26 is a member which electromagnetically shields the long-side inner terminal 22. For example, phosphor bronze may be used as the outer terminal 26. Phosphor bronze is elastically deformable material having conductivity. The outer terminal 26 is formed through bending, for example.

[Female-Type Electrical Connector]

Figure 6:
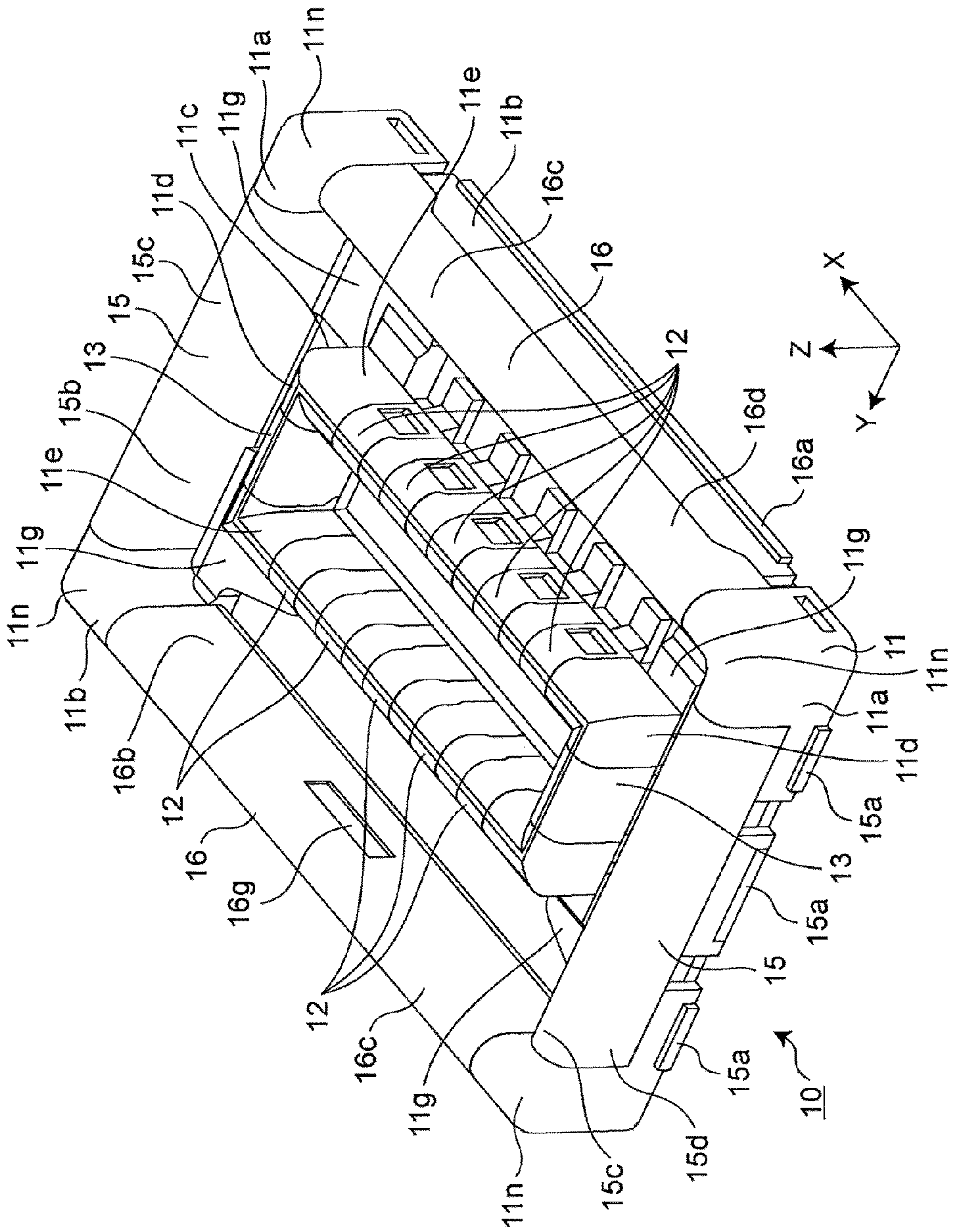
FIG. 6 is a perspective view of a female-type electrical connector which constitutes the electrical connector set illustrated in FIG. 1.
Figure 7:
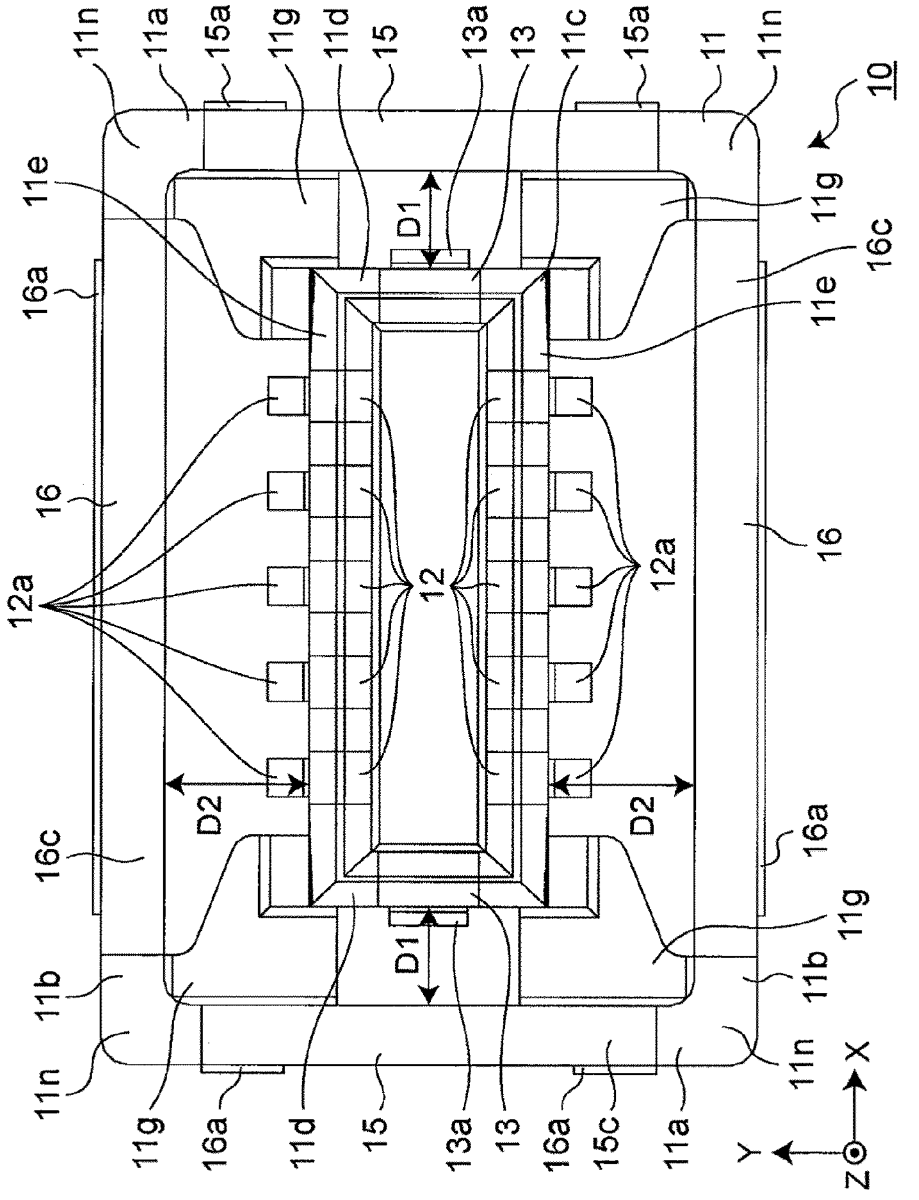
FIG. 7 is a plan view of the female-type electrical connector illustrated in FIG. 6.
Figure 8:
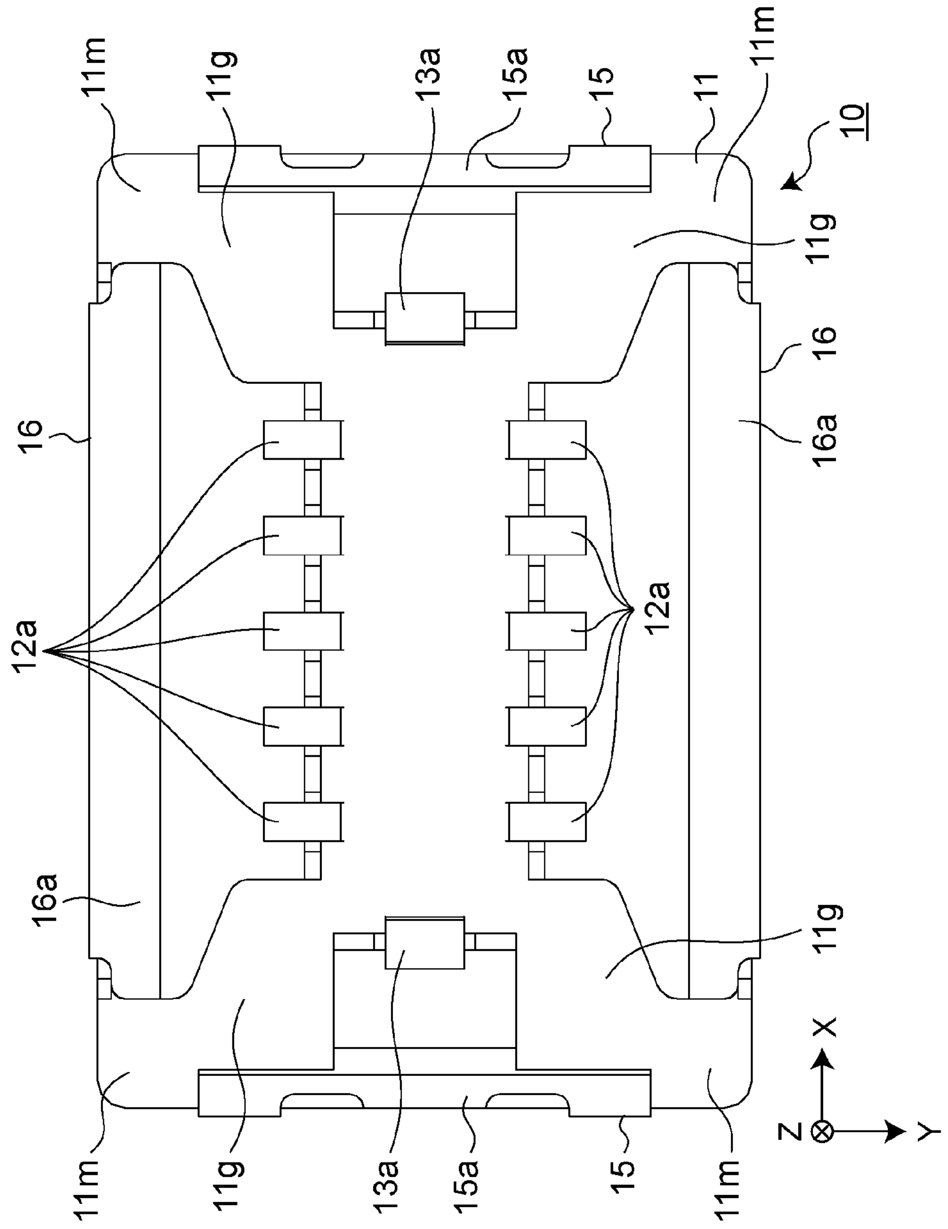
FIG. 8 is a bottom view of the female-type electrical connector illustrated in FIG. 6.
Figure 9:
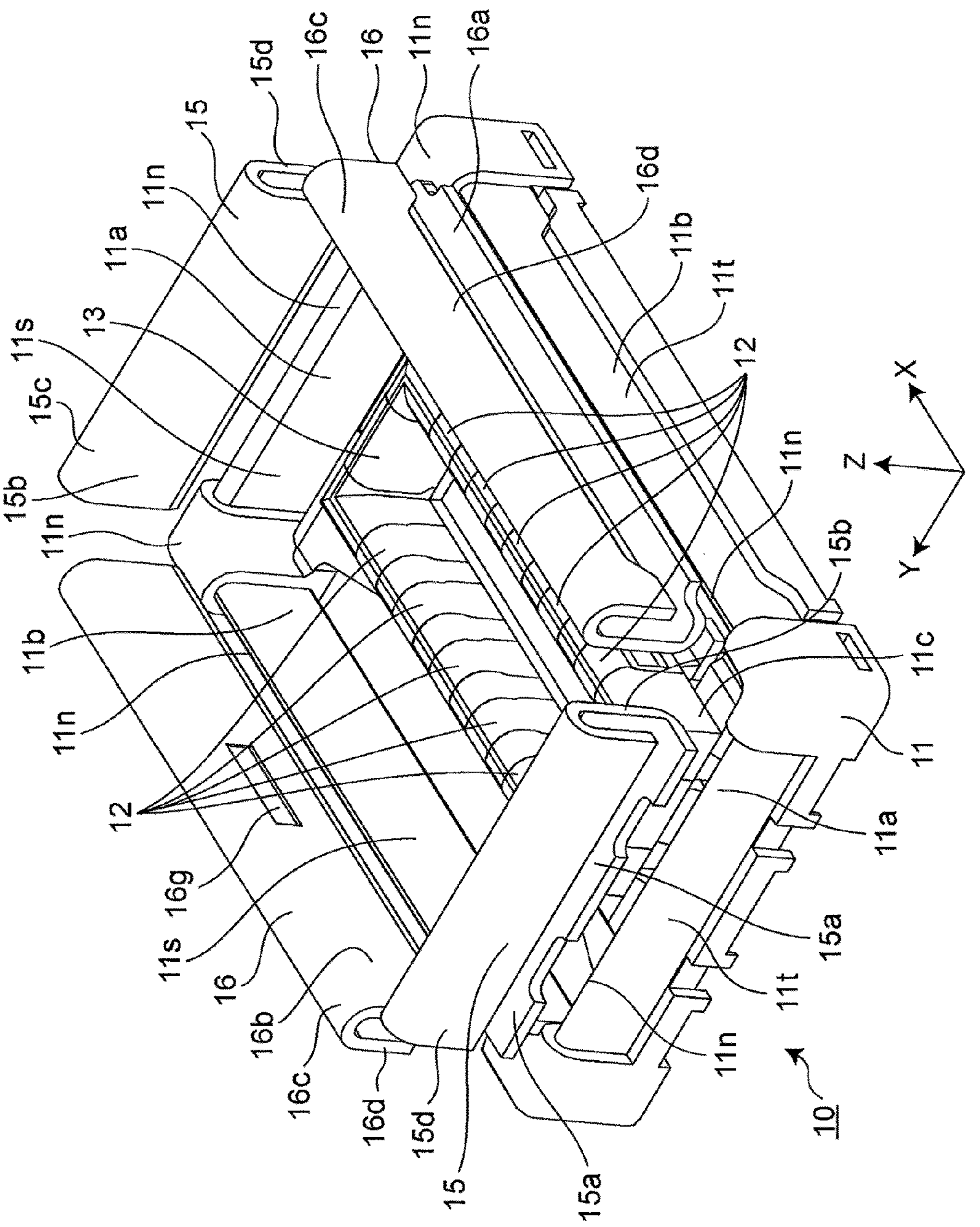
FIG. 9 is an exploded perspective view of the female-type electrical connector illustrated in FIG. 6.
Figure 10:
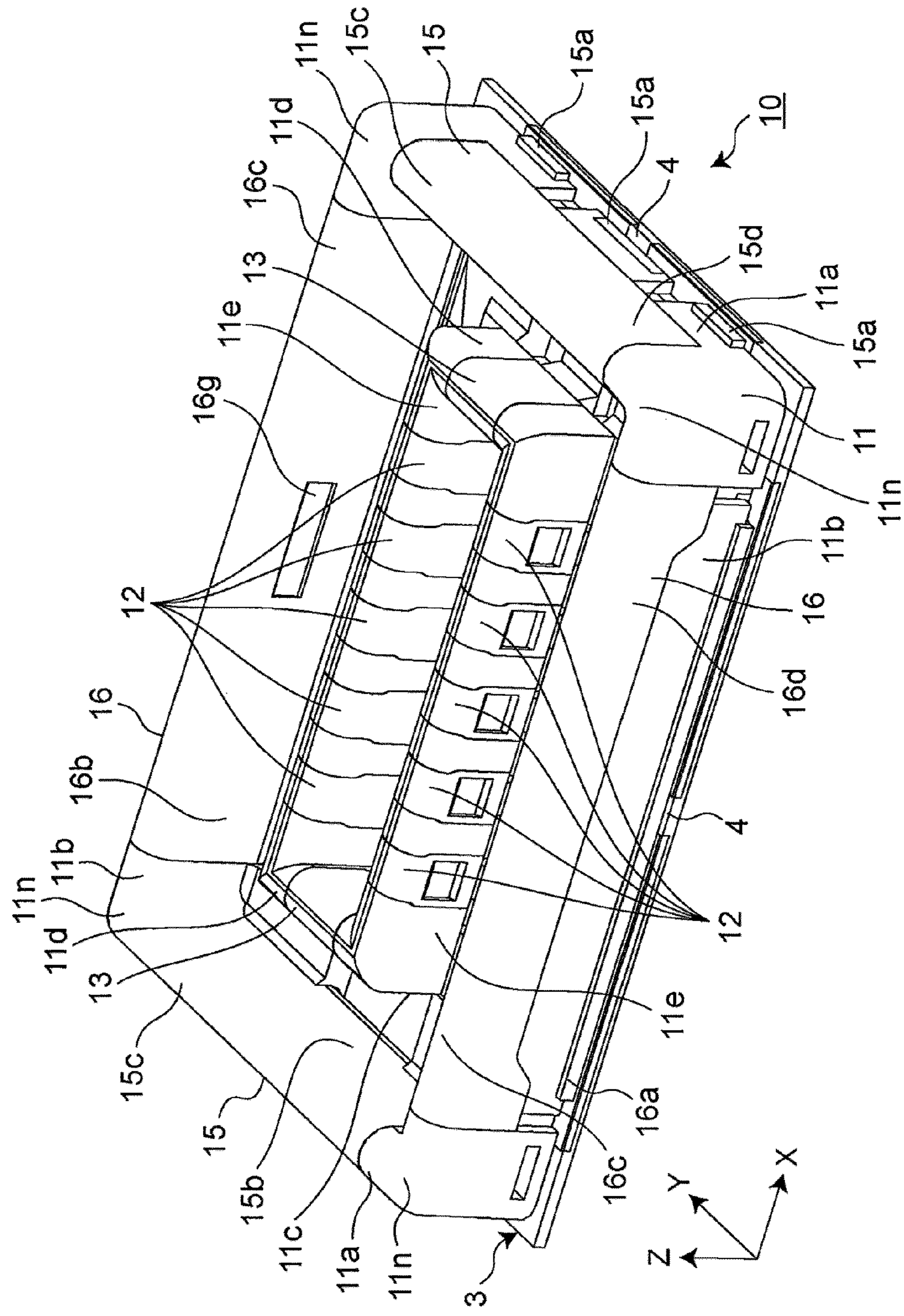
FIG. 10 is a perspective view illustrating a state where the female-type electrical connector illustrated in FIG. 6 is mounted on a circuit board.
Figure 11:
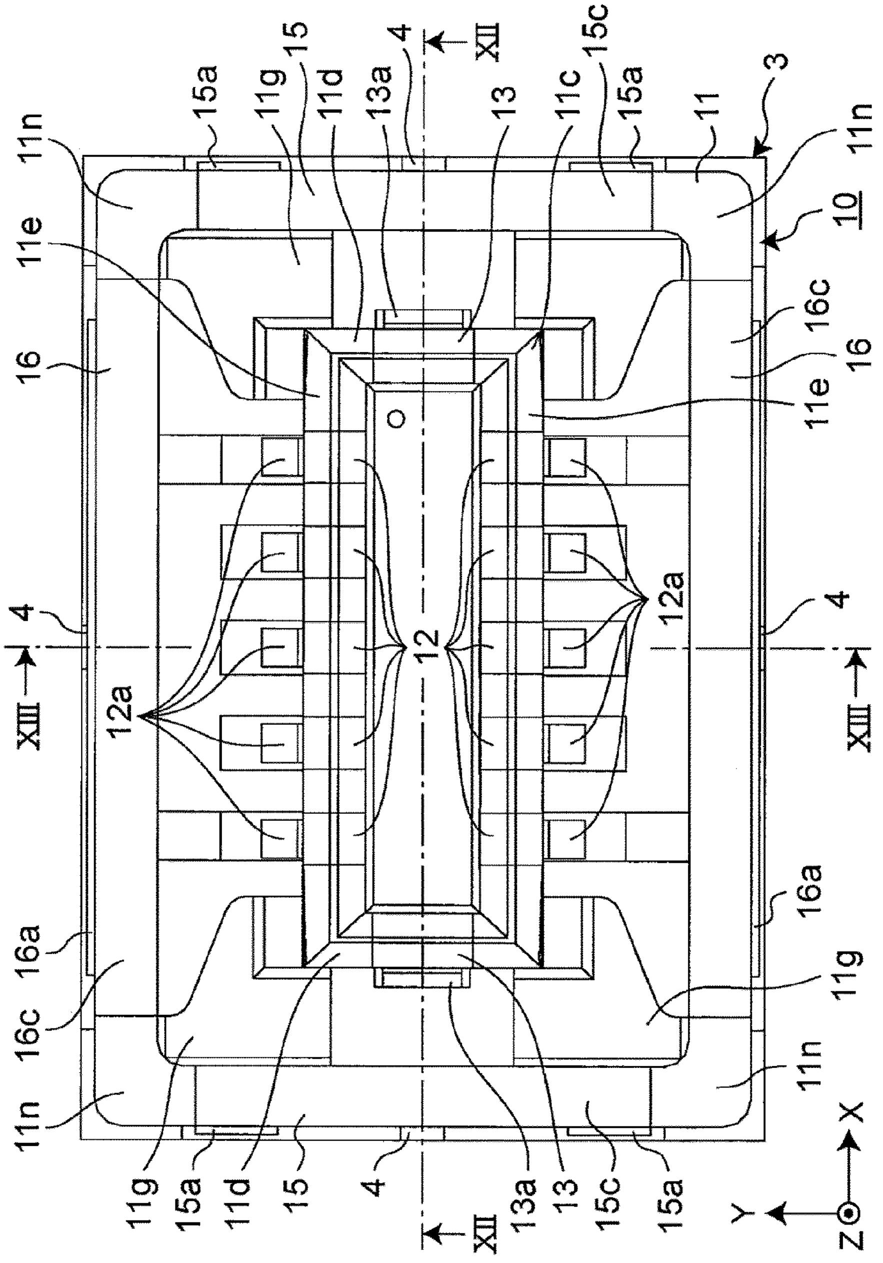
FIG. 11 is a plan view of the female-type electrical connector mounted on the circuit board illustrated in FIG. 10.
Figure 12:
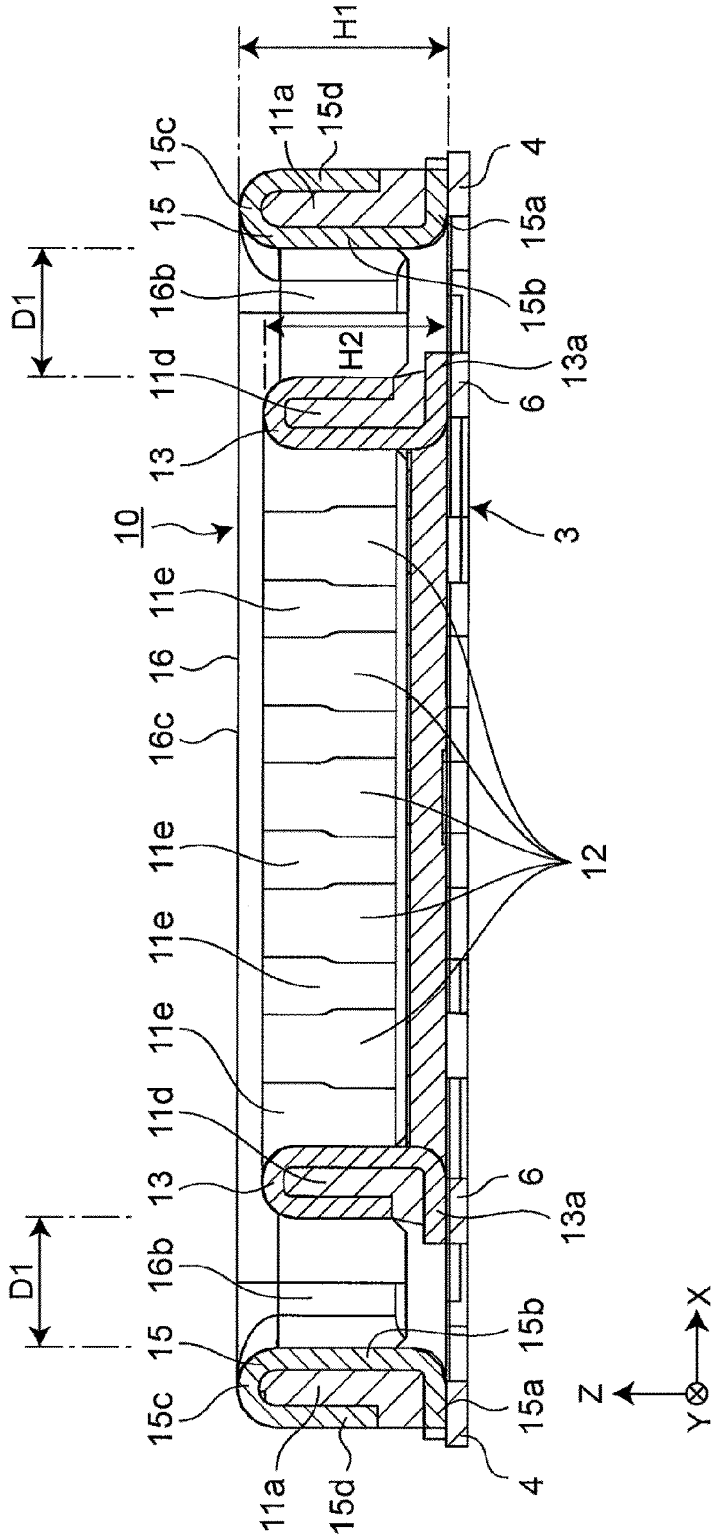
FIG. 12 is a sectional view of the female-type electrical connector mounted on the circuit board taken along line XII-XII in FIG. 11.
Figure 13:
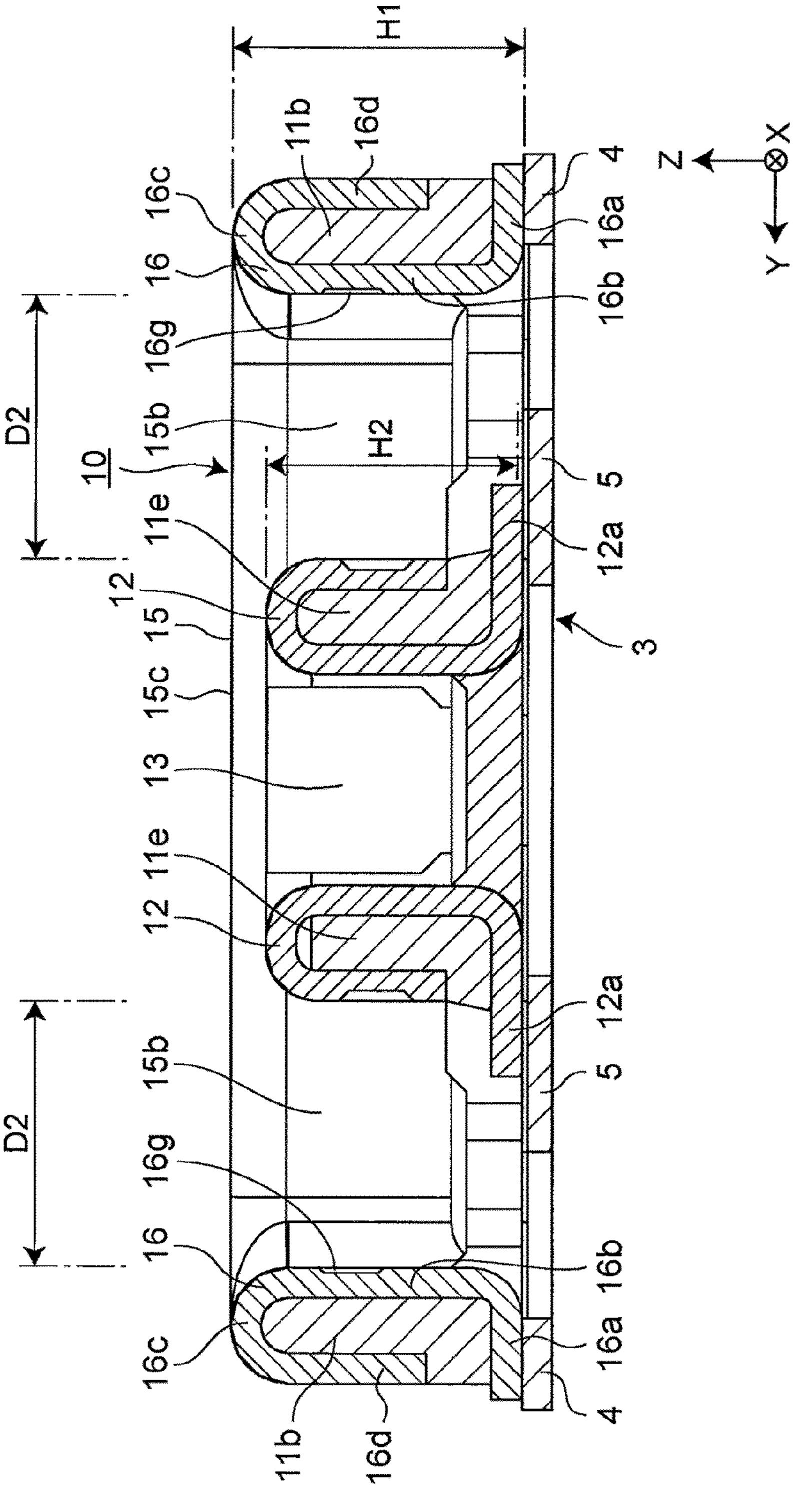
FIG. 13 is a sectional view of the female-type electrical connector mounted on the circuit board taken along line XIII-XIII in FIG. 11.
Figure 14:
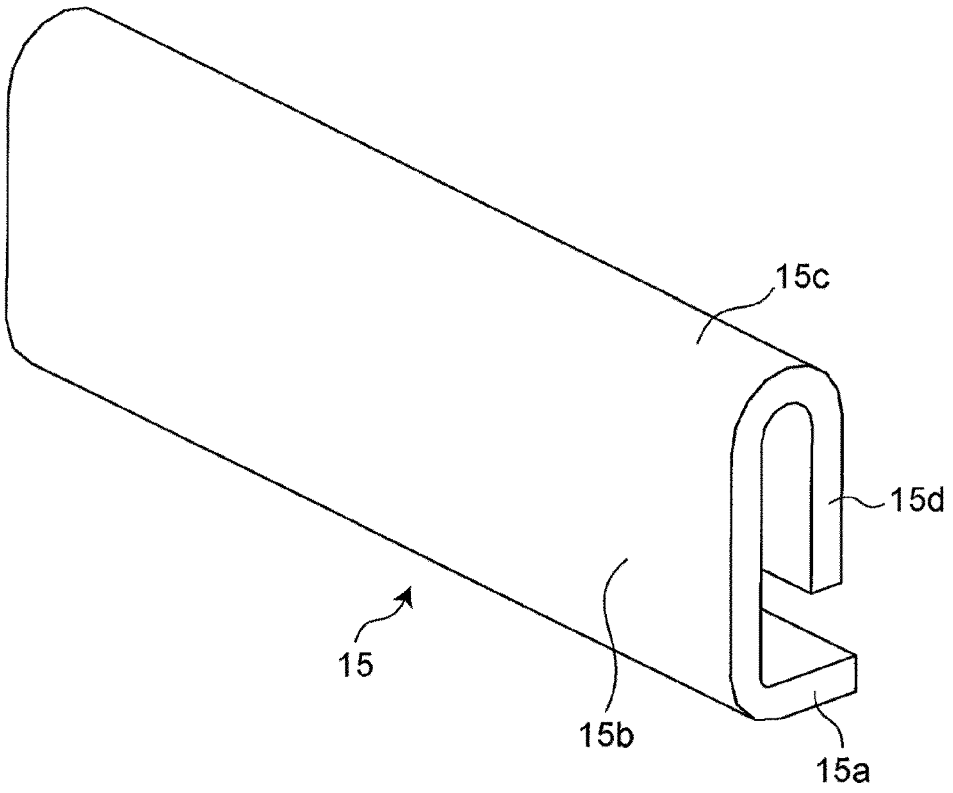
FIG. 14 is a perspective view of a short-side outer terminal which constitutes the female-type electrical connector illustrated in FIG. 6.
Figure 15:
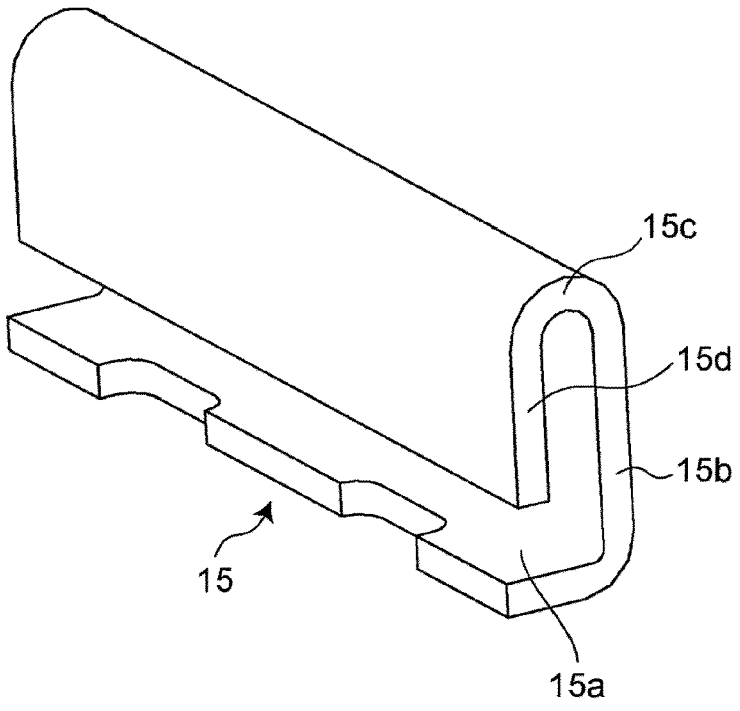
FIG. 15 is a perspective view of the short-side outer terminal illustrated in FIG. 14 when seen in a different direction.
Figure 16:
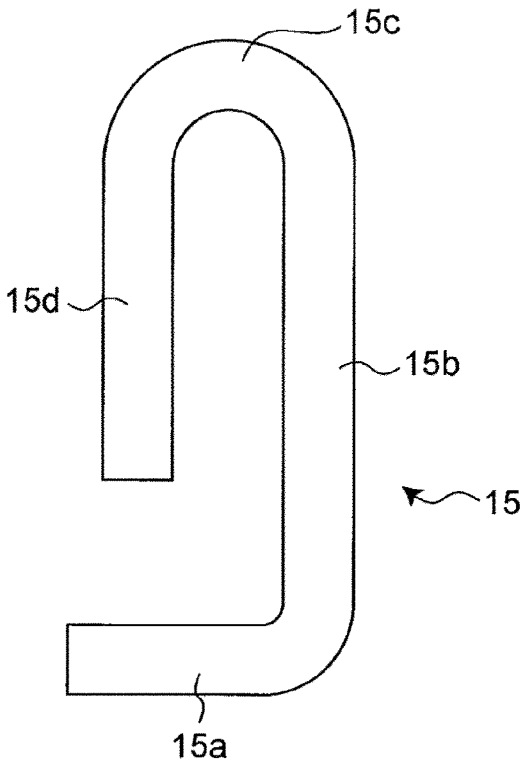
FIG. 16 is a side view of the short-side outer terminal illustrated in FIG. 15.
Figure 17:
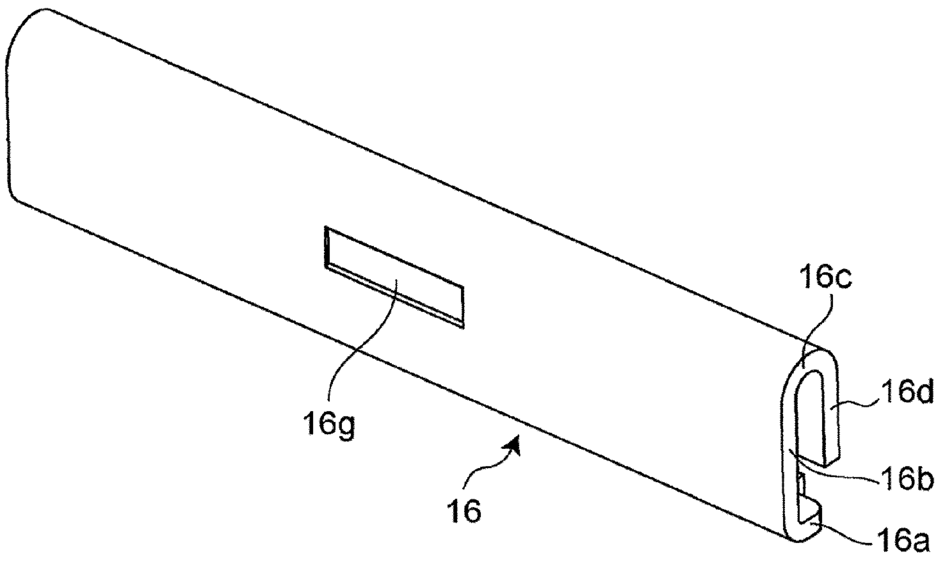
FIG. 17 is a perspective view of a long-side outer terminal which constitutes the female-type electrical connector illustrated in FIG. 6.
Figure 18:
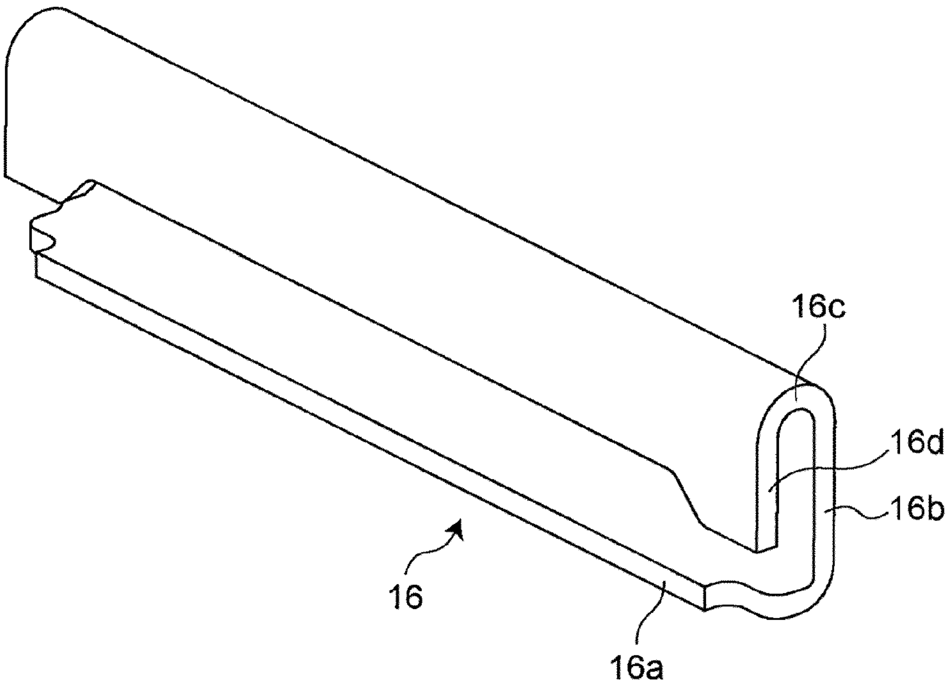
FIG. 18 is a perspective view of the long-side outer terminal illustrated in FIG. 17 when seen in a different direction.
Figure 19:
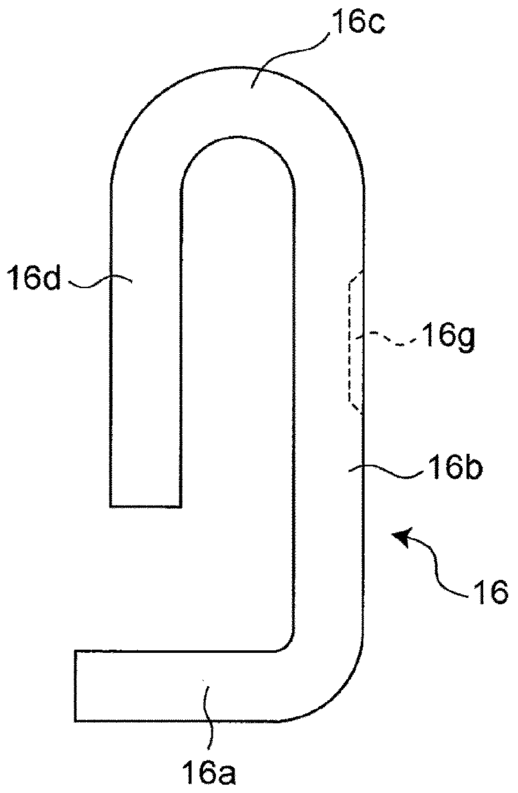
FIG. 19 is a side view of the long-side outer terminal illustrated in FIG. 18.

A configuration of the female-type electrical connector 10 is described with reference to FIGS. 6 to 19. FIG. 6 is a perspective view of the female-type electrical connector 10 which constitutes the electrical connector set 1 illustrated in FIG. 1. FIG. 7 is a plan view of the female-type electrical connector 10 illustrated in FIG. 6. FIG. 8 is a bottom view of the female-type electrical connector 10 illustrated in FIG. 6. FIG. 9 is an exploded perspective view of the female-type electrical connector 10 illustrated in FIG. 6. FIG. 10 is a perspective view illustrating a state where the female-type electrical connector 10 illustrated in FIG. 6 is mounted on a circuit board 3. FIG. 11 is a plan view of the female-type electrical connector 10 mounted on the circuit board 3 illustrated in FIG. 10. FIG. 12 is a sectional view of the female-type electrical connector 10 mounted on the circuit board 3 taken along line XII-XII in FIG. 11. FIG. 13 is a sectional view of the female-type electrical connector 10 mounted on the circuit board 3 taken along line XIII-XIII in FIG. 11. FIG. 14 is a perspective view of the short-side outer terminal 15 which constitutes the female-type electrical connector 10 illustrated in FIG. 6. FIG. 15 is a perspective view of the short-side outer terminal 15 illustrated in FIG. 14 when seen in a different direction. FIG. 16 is a side view of the short-side outer terminal 15 illustrated in FIG. 15. FIG. 17 is a perspective view of the long-side outer terminal 16 which constitutes the female-type electrical connector 10 illustrated in FIG. 6. FIG. 18 is a perspective view of the long-side outer terminal 16 illustrated in FIG. 17 when seen in a different direction. FIG. 19 is a side view of the long-side outer terminal 16 illustrated in FIG. 18.

The female-type electrical connector 10 includes a holding member 11, an inner terminal (that is, the plurality of long-side inner terminals 12 and short-side inner terminals 13), and an outer terminal (that is, the two short-side outer terminals 15 and the two long-side outer terminals 16).

The holding member 11 has a rectangular shape extending in the long-side direction (X-axis direction) and the short-side direction (Y-axis direction) of the female-type electrical connector 10. The holding member 11 includes two short-side beam parts 11*a*, two long-side beam parts 11*b*, a middle holding part 11*c*, and four bottom-surface supporting parts 11*g*.

The short-side beam parts 11*a* extend in the short-side direction (Y-axis direction), and are separate from each other in the long-side direction (X-axis direction). The long-side beam parts 11*b* extend in the long-side direction (X-axis direction), and are separate from each other in the short-side direction (Y-axis direction). Each of the short-side beam part 11*a* and the long-side beam part 11*b* has a first surface 11*m* on a first side which is a side facing the mounting circuit board 3, a second surface 11*n* on a second side opposite from the first side, and an inner side surface 11*s* and an outer side surface 11*t* connecting the first surface 11*m* to the second surface 11*n*. As the holding member 11, for example, an electrically insulating resin such as liquid crystal polymer is used.

The middle holding part 11*c* is supported by the four bottom-surface supporting parts 11*g*. The middle holding part 11*c* has a rectangular shape extending in the long-side direction (X-axis direction) and the short-side direction (Y-axis direction) of the female-type electrical connector 10, and includes a longitudinal middle part 11*e* and a transversal middle part 11*d*.

The longitudinal middle part 11*e* has a plurality of long-side attachment parts each in a recessed shape. The plurality of long-side inner terminals 12 are held by being attached to the long-side attachment parts. The plurality of long-side inner terminals 12 are aligned in the long-side direction (X-axis direction) of the female-type electrical connector 10. The long-side inner terminal 12 corresponds one-to-one with the long-side inner terminal 22 of the male-type electrical connector 20 described above. The long-side inner terminal 12 establishes electrical connection while being engaged with the corresponding long-side inner terminal 22.

In the long-side inner terminal 12 illustrated in FIGS. 6 to 11, a plurality of (for example, five) long-side inner terminals 12 aligned in a row in the long-side direction (X-axis direction) are disposed such that the row becomes each of a first row and a second row arranged in the short-side direction (Y-axis direction), the first and second rows being separate from each other in the short-side direction (Y-axis direction). In this configuration, many long-side inner terminals 12 can be disposed at the middle holding part 11*c* having a limited size. Note that the arrangement of the plurality of long-side inner terminals 12 is not limited to be in two rows (for example, the first row and the second row), and may be in one row or three or more rows. Further, the number of long-side inner terminal 12 in one row is not limited to five, and may be four or less or six or more.

The long-side inner terminal 12 is, for example, a conductor connected to a signal potential or a ground potential, and is configured by a stick-like member having conductivity being bent. For example, phosphor bronze may be used as the long-side inner terminal 12. Phosphor bronze is elastically deformable material having conductivity. For example, gold plating or the like may be applied to a surface of the long-side inner terminal 12. The long-side inner terminal 12 extends in the short-side direction (Y-axis direction). The long-side inner terminal 12 includes a long-side mounted part 12*a* to be mounted on a first land electrode 5 of the circuit board 3 illustrated in FIGS. 10 to 13. The long-side mounted part 12*a* is formed at a side end in the short-side direction (Y-axis direction).

The short-side inner terminal 13 is a conductor connected to a signal potential, and is configured by a stick-like member having conductivity being bent. For example, phosphor bronze may be used as the short-side inner terminal 13. Phosphor bronze is elastically deformable material having conductivity. For example, gold plating or the like may be applied to a surface of the short-side inner terminal 13. The short-side inner terminal 13 extends in the long-side direction (X-axis direction). The short-side inner terminal 13 includes a short-side mounted part 13*a* to be mounted on a second land electrode 6 of the circuit board 3 illustrated in FIGS. 10 to 13. The short-side mounted part 13*a* is formed at a side end in the long-side direction (X-axis direction) and at a lower end in the insertion direction (Z-axis direction). A terminal width of the short-side inner terminal 13 is larger than a terminal width of the long-side inner terminal 12. Therefore, conductor loss at a high frequency can be reduced. In the short-side inner terminal 13, a signal at a frequency higher than a signal which flows in the long-side inner terminal 12 flows, and for example, a high-frequency signal at or higher than 5 GHz flows.

The female-type electrical connector 10 includes the two short-side outer terminals 15 and the two long-side outer terminals 16 which serve as the outer terminals. The short-side outer terminal 15 extends in the short-side direction (Y-axis direction), and the long-side outer terminal 16 extends in the long-side direction (X-axis direction). The short-side outer terminal 15 and the long-side outer terminal 16 are configured by separate members and isolated from each other. In this example, each of the long-side outer terminals 16 extends in the long-side direction along a respective one of the long-side beam parts 11*b* from a position proximate to one of the short-side beam parts 11*a* to a position proximate to the other of the short-side beam parts 11*a*. Therefore, an amount of elastic deformation of each of the short-side outer terminal 15 and the long-side outer terminal 16 can be adjusted separately.

When seen in the insertion direction (Z-axis direction), the plurality of long-side inner terminals 12 and short-side inner terminals 13 are surrounded by the two short-side outer terminals 15 and the two long-side outer terminals 16. The space surrounded by the two short-side outer terminals 15 and the two long-side outer terminals 16 can be made to be an electromagnetically shielded space. That is, the two short-side outer terminals 15 and the two long-side outer terminals 16 are members that electromagnetically shield the long-side inner terminals 12 and the short-side inner terminals 13 by surrounding the long-side inner terminals 12 and the short-side inner terminals 13.

The short-side outer terminal 15 is a conductor connected to a ground potential. The short-side outer terminal 15 is connected to the ground potential so that it blocks an electromagnetic wave from outside and unwanted radiation from the short-side inner terminal 13. For example, phosphor bronze may be used as the short-side outer terminal 15. Phosphor bronze is elastically deformable material having conductivity. For example, gold plating or the like may be applied to a surface of the short-side outer terminal 15. The short-side outer terminal 15 is formed through bending, for example.

The short-side outer terminal 15 is integrally fixed with the short-side beam part 11*a* of the holding member 11. For example, the integral fixing is achieved through insert molding in which resin for the holding member 11 is injected around the short-side outer terminal 15 contained in a mold and the short-side outer terminal 15 and the resin for the holding member 11 are integrated. Alternatively, the integral fixing may be achieved in a configuration in which the short-side outer terminal 15 is fitted to the short-side beam part 11*a* of the holding member 11.

By the integral fixing, displacement of the short-side outer terminal 15 during insertion and removal in the electrical connector set 1 can be suppressed. Thus, stable mounting of the short-side outer terminal 15 on the circuit board 3 can be maintained. Moreover, since a thickness of the short-side outer terminal 15 can be made thinner by the integral fixing, the height of the female-type electrical connector 10 can be reduced.

As illustrated in FIGS. 14 to 16, the short-side outer terminal 15 includes a short-side lower part 15*a*, a short-side inner part 15*b*, a short-side upper part 15*c*, and a short-side outer part 15*d*. The short-side lower part 15*a* serves as a first part extending along the first surface 11*m* on the first side which is the side facing the mounting circuit board 3. Moreover, the short-side lower part 15*a* serves as a short-side outer mounted part to be mounted on a ground electrode 4 of the circuit board 3 illustrated in FIGS. 10 to 13.

The short-side inner part 15*b* is connected to the short-side lower part 15*a*, and serves as an inner part extending along the inner side surface 11*s*. The short-side upper part 15*c* is connected to the short-side inner part 15*b*, and serves as a second part extending along the second surface 11*n*. The short-side outer part 15*d* is connected to the short-side upper part 15*c*, and serves as an outer part extending along the outer side surface 11*t*. Therefore, the short-side outer part 15*d* is located at the farthest from the ground. An end portion of the short-side outer part 15*d* is located in the insertion direction (Z-axis direction) of the short-side outer terminal 15, and is located, for example, closer to the short-side lower part 15*a* than is the half of the height H1 of the short-side outer terminal 15 in the insertion direction (Z-axis direction).

In the short-side outer terminal 15, the short-side lower part 15*a* connected to the ground electrode 4 has the lowest electric potential, and an electric potential to a high frequency increases in the order of the short-side inner part 15*b*, the short-side upper part 15*c*, and the short-side outer part 15*d*. By such difference in the electric potential, an electric field from the short-side outer part 15*d* toward the short-side inner part 15*b* is caused in the short-side outer terminal 15. On the other hand, from the short-side inner terminal 13, a high-frequency radiation noise is radiated from an inner side portion toward an outer side portion. The direction of the electric field caused in the short-side outer terminal 15 is opposite from the direction of the high-frequency radiation noise from the short-side inner terminal 13. Therefore, the high-frequency radiation noise from the short-side inner terminal 13 can be suppressed.

The long-side outer terminal 16 is a conductor connected to a ground potential. The long-side outer terminal 16 is connected to the ground potential so that it blocks an electromagnetic wave from outside and unwanted radiation from the long-side inner terminal 12. For example, phosphor bronze may be used as the long-side outer terminal 16. Phosphor bronze is elastically deformable material having conductivity. For example, gold plating or the like may be applied to a surface of the long-side outer terminal 16. The long-side outer terminal 16 is formed through bending, for example.

The long-side outer terminal 16 is integrally fixed with the long-side beam part 11*b* of the holding member 11. For example, the integral fixing is achieved through insert molding in which resin for the holding member 11 is injected around the long-side outer terminal 16 contained in a mold and the long-side outer terminal 16 and the resin for the holding member 11 are integrated. Alternatively, the integral fixing may be achieved in a configuration in which the long-side outer terminal 16 is fitted to the long-side beam part 11*b* of the holding member 11.

By the integral fixing, displacement of the long-side outer terminal 16 during insertion and removal in the electrical connector set 1 can be suppressed. Thus, stable mounting of the long-side outer terminal 16 on the circuit board 3 can be maintained. Moreover, since a thickness of the long-side outer terminal 16 can be made thinner by the integral fixing, the height of the female-type electrical connector 10 can be reduced.

As illustrated in FIGS. 17 to 19, the long-side outer terminal 16 includes a long-side lower part 16*a*, a long-side inner part 16*b*, a long-side upper part 16*c*, and a long-side outer part 16*d*. The long-side lower part 16*a* serves as a first part extending along the first surface 11*m* on the first side which is the side facing the mounting circuit board 3. Moreover, the long-side lower part 16*a* serves as a long-side outer mounted part to be mounted on the ground electrode 4 of the circuit board 3 illustrated in FIGS. 10 to 13.

The long-side inner part 16*b* is connected to the long-side lower part 16*a*, and serves as an inner part extending along the inner side surface 11*s*. The long-side upper part 16*c* is connected to the long-side inner part 16*b*, and serves as a second part extending along the second surface 11*n*. The long-side outer part 16*d* is connected to the long-side upper part 16*c*, and serves as an outer part extending along the outer side surface 11*t*. Therefore, the long-side outer part 16*d* is located at the farthest from the ground. An end portion of the long-side outer part 16*d* is located in the insertion direction (Z-axis direction) of the long-side outer terminal 16, and is located, for example, closer to the long-side lower part 16*a* than is the half of the height H1 of the long-side outer terminal 16 in the insertion direction (Z-axis direction).

In the long-side outer terminal 16, the long-side lower part 16*a* connected to the ground electrode 4 has the lowest electric potential, and an electric potential to a high frequency increases in the order of the long-side inner part 16*b*, the long-side upper part 16*c*, and the long-side outer part 16*d*. By such difference in the electric potential, an electric field from the long-side outer part 16*d* toward the long-side inner part 16*b* is caused in the long-side outer terminal 16. On the other hand, from the long-side inner terminal 12, a high-frequency radiation noise is radiated from an inner side portion toward an outer side portion. The direction of the electric field caused in the long-side outer terminal 16 is opposite from the direction of the high-frequency radiation noise from the long-side inner terminal 12. Therefore, the high-frequency radiation noise from the long-side inner terminal 12 can be suppressed.

Therefore, when the outer terminals 15 and 16 have the first parts 15*a* and 16*a*, the inner parts 15*b* and 16*b*, the second parts 15*c* and 16*c*, and the outer parts 15*d* and 16*d*, the directions of the electric fields caused in the outer terminals 15 and 16 are opposite from the directions of the high-frequency radiation noise from the inner terminals 12 and 13. Thus, the high-frequency radiation noise from the inner terminals 12 and 13 can be suppressed.

The long-side outer terminal 16 has the recess 16*g* in the long-side inner part 16*b*. The recess 16*g* is located at the middle portion in the long-side direction (X-axis direction), and extends in the long-side direction (X-axis direction). The recess 16*g* serves as a mated part which is mated with the protruding part 26*g* of the outer part 26*b*, in the mated state of the electrical connector set 1.

As illustrated in FIGS. 7, 12, and 13, a short-side distance D1 is a distance between the short-side inner terminal 13 and the short-side outer terminal 15 when seen in the insertion direction (Z-axis direction), and is, for example, a distance between an outer surface of the short-side inner terminal 13 and an inner surface of the short-side inner part 15*b* of the short-side outer terminal 15. A long-side distance D2 is a distance between the long-side inner terminal 12 and the long-side outer terminal 16 when seen in the insertion direction (Z-axis direction), and is, for example, a distance between an outer surface of the long-side inner terminal 12 and an inner surface of the long-side inner part 16*b* of the long-side outer terminal 16. The short-side distance D1 between the short-side inner terminal 13 and the short-side outer terminal 15 is configured to be shorter than the long-side distance D2 between the long-side inner terminal 12 and the long-side outer terminal 16. In other words, the short-side outer terminal 15 is disposed close to the short-side inner terminal 13. Therefore, the high-frequency radiation noise from the short-side inner terminal 13 can easily be suppressed.

As illustrated in FIG. 12, the height of the short-side outer terminal 15 is higher than the height of the short-side inner terminal 13. As illustrated in FIG. 13, the height of the long-side outer terminal 16 is higher than the height of the long-side inner terminal 12. Therefore, the high-frequency radiation noise from the short-side inner terminal 13 and the long-side inner terminal 12 can easily be suppressed, and the short-side inner terminal 13 and the long-side inner terminal 12 are protected.

Figure 20:
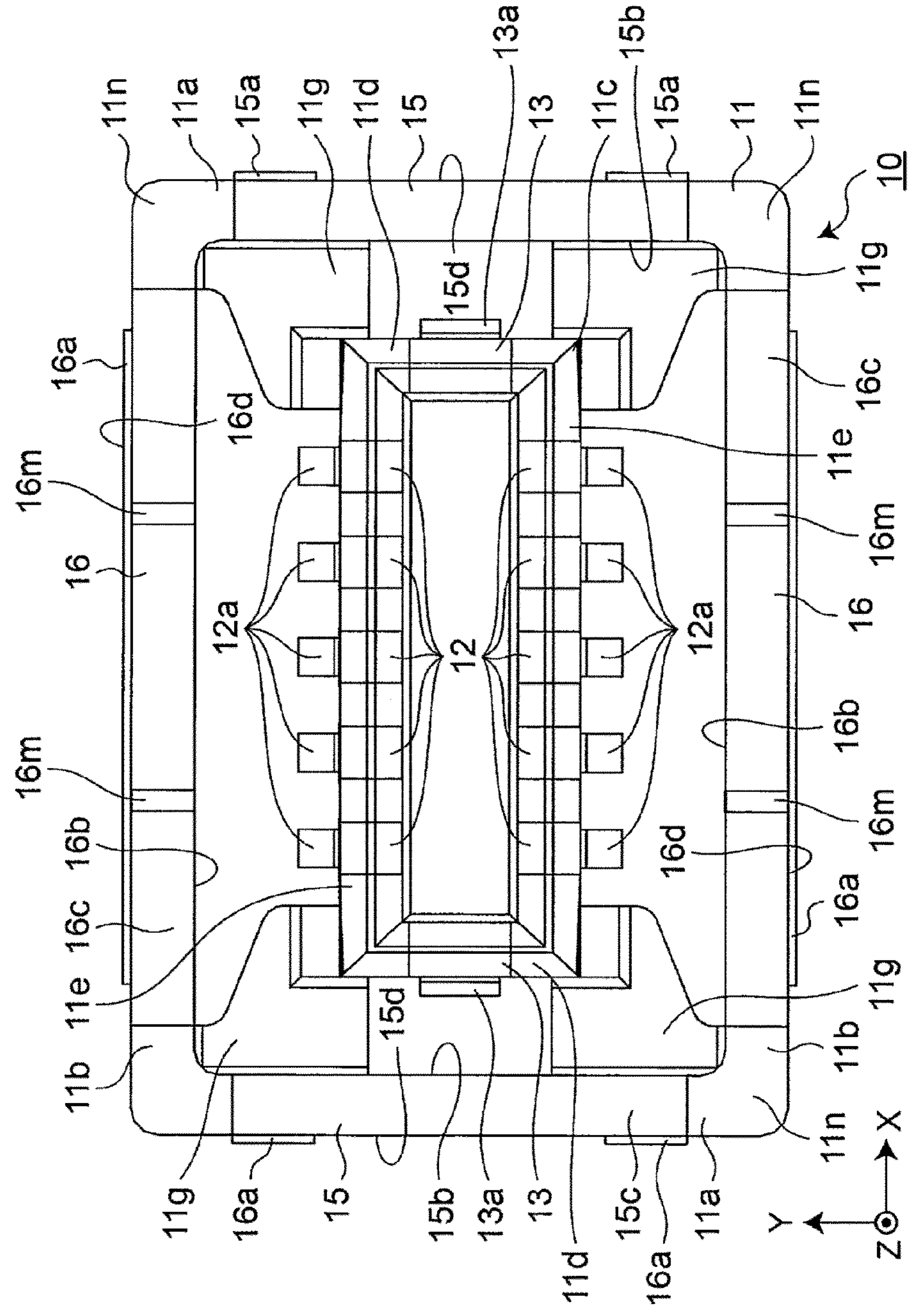
FIG. 20 is a plan view illustrating a female-type electrical connector according to a second embodiment.

A second embodiment is described with reference to FIG. 20. FIG. 20 is a plan view illustrating the female-type electrical connector 10 according to the second embodiment.

In the female-type electrical connector 10 according to the second embodiment, the long-side upper part 16*c* of the outer terminal is provided with a slit 16*m* extending to connect the long-side inner part 16*b* to the long-side outer part 16*d*.

In the long-side outer terminal 16, the long-side upper part 16*c* is partially notched to form the slit 16*m*. The slit 16*m* extends to connect the long-side inner part 16*b* to the long-side outer part 16*d*. In the aspect illustrated in FIG. 20, two slits 16*m* are provided to the long-side upper part 16*c* to be formed separately from each other in the long-side direction (X-axis direction). Therefore, an amount of elastic deformation of the long-side outer terminal 16, which has the recess 16*g* which serves as the mated part, and the long-side beam part 11*b* can be adjusted.

A width of the slit 16*m* in the long-side direction (X-axis direction) is narrower than a width of the long-side inner terminal 12 in the long-side direction (X-axis direction). The slit 16*m* is disposed to face the longitudinal middle part 11*e* (holding member 11) holding the long-side inner terminal 12. For example, the position of the slit 16*m* is in front of the longitudinal middle part 11*e* (holding member 11) located between the inner terminals 12. Therefore, leakage of the high-frequency radiation noise from the long-side inner terminal 12 through the slit 16*m* can be suppressed.

Figure 21:
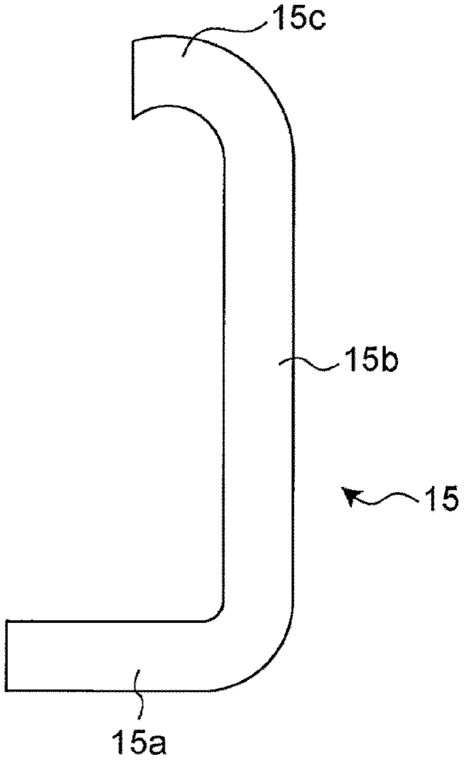
FIG. 21 is a side view of a short-side outer terminal which constitutes a female-type electrical connector according to a third embodiment.
Figure 22:
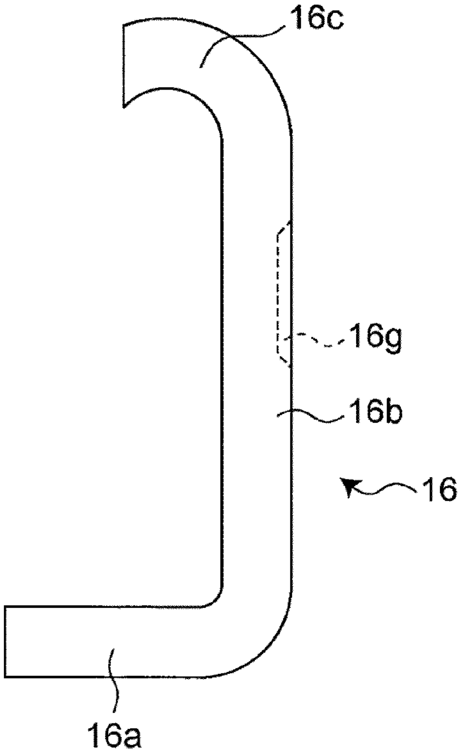
FIG. 22 is a side view of a long-side outer terminal which constitutes the female-type electrical connector according to the third embodiment.

A third embodiment is described with reference to FIGS. 21 and 22. FIG. 21 is a side view of the short-side outer terminal 15 which constitutes the female-type electrical connector 10 according to the third embodiment. FIG. 22 is a side view of the long-side outer terminal 16 which constitutes the female-type electrical connector 10 according to the third embodiment.

In the female-type electrical connector 10 according to the third embodiment, the short-side outer terminal 15 has the short-side lower part 15*a*, the short-side inner part 15*b*, and the short-side upper part 15*c*. The long-side outer terminal 16 has the long-side lower part 16*a*, the long-side inner part 16*b*, and the long-side upper part 16*c*. An end portion of the short-side upper part 15*c* is located in the long-side direction (X-axis direction) of the short-side outer terminal 15, and is located to be, for example, shorter than the width of the short-side outer terminal 15 in the long-side direction (X-axis direction). An end portion of the long-side upper part 16*c* is located in the short-side direction (Y-axis direction) of the long-side outer terminal 16, and is located to be, for example, shorter than the width of the long-side outer terminal 16 in the short-side direction (Y-axis direction).

In the short-side outer terminal 15, the short-side lower part 15*a* connected to the ground electrode 4 has the lowest electric potential, and an electric potential to a high frequency increases in the order of the short-side inner part 15*b* and the short-side upper part 15*c*. By such difference in the electric potential, an electric field from the short-side upper part 15*c* toward the short-side lower part 15*a* is caused in the short-side outer terminal 15. On the other hand, from the short-side inner terminal 13, a high-frequency radiation noise is radiated from an inner side portion toward an outer side portion. The direction of the electric field caused in the short-side outer terminal 15 is orthogonal to the direction of the high-frequency radiation noise from the short-side inner terminal 13. In other words, the electric field caused in the short-side outer terminal 15 is not an electric field which promotes the high-frequency radiation noise from the short-side inner terminal 13. Therefore, the high-frequency radiation noise from the short-side inner terminal 13 can be suppressed.

Similarly, in the long-side outer terminal 16, the long-side lower part 16*a* connected to the ground electrode 4 has the lowest electric potential, and an electric potential to a high frequency increases in the order of the long-side inner part 16*b* and the long-side upper part 16*c*. By such difference in the electric potential, an electric field from the long-side upper part 16*c* toward the long-side lower part 16*a* is caused in the long-side outer terminal 16. On the other hand, from the long-side inner terminal 12, a high-frequency radiation noise is radiated from an inner side portion toward an outer side portion. The direction of the electric field caused in the long-side outer terminal 16 is orthogonal to the direction of the high-frequency radiation noise from the long-side inner terminal 12. In other words, the electric field caused in the long-side outer terminal 16 is not an electric field which promotes the high-frequency radiation noise from the long-side inner terminal 12. Therefore, the high-frequency radiation noise from the long-side inner terminal 12 can be suppressed.

Therefore, when the outer terminals 15 and 16 have the first parts 15*a* and 16*a*, the inner parts 15*b* and 16*b*, and the second parts 15*c* and 16*c*, the electric field which promotes the high-frequency radiation noise is not caused from the outer terminals 15 and 16. Thus, the high-frequency radiation noise from the inner terminals 12 and 13 can be suppressed.

Note that, in the third embodiment illustrated in FIGS. 21 and 22, the end portions of the short-side upper part 15*c* and the long-side upper part 15*c* terminate in contact with respective protruding portions of the second surfaces 11*n* of the short-side beam part 11*a* and the long-side beam part 11*b*. Therefore, rattling of the short-side outer terminal 15 and the long-side outer terminal 16 can be suppressed.

Figure 23:
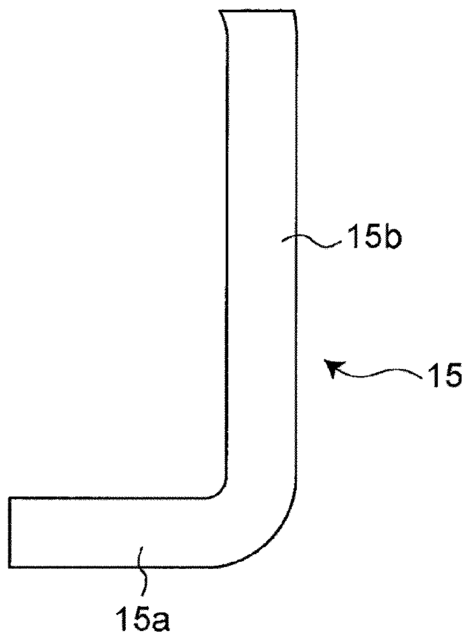
FIG. 23 is a side view of a short-side outer terminal which constitutes a female-type electrical connector according to a fourth embodiment.
Figure 24:
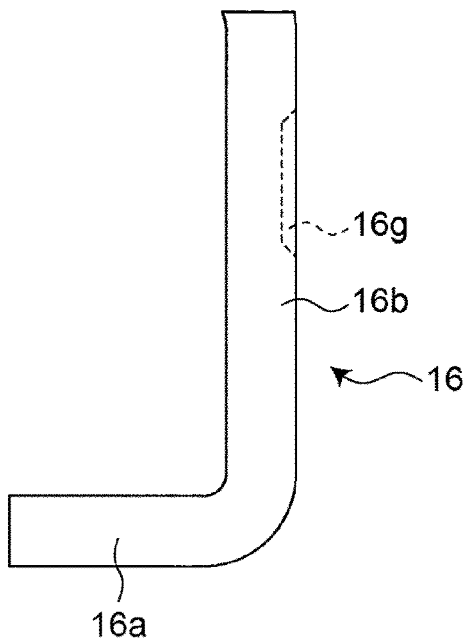
FIG. 24 is a side view of a long-side outer terminal which constitutes the female-type electrical connector according to the fourth embodiment.

A fourth embodiment is described with reference to FIGS. 23 and 24. FIG. 23 is a side view of the short-side outer terminal 15 which constitutes the female-type electrical connector 10 according to the fourth embodiment. FIG. 24 is a side view of the long-side outer terminal 16 which constitutes the female-type electrical connector 10 according to the fourth embodiment.

In the female-type electrical connector 10 according to the fourth embodiment, the short-side outer terminal 15 has the short-side lower part 15*a* and the short-side inner part 15*b*, and the long-side outer terminal 16 has the long-side lower part 16*a* and the long-side inner part 16*b*. An end portion of the short-side inner part 15*b* is located in the insertion direction (Z-axis direction) of the short-side outer terminal 15, and is located to be, for example, shorter than the height H1 of the short-side outer terminal 15 in the insertion direction (Z-axis direction). An end portion of the long-side inner part 16*b* is located in the insertion direction (Z-axis direction) of the long-side outer terminal 16, and is located to be, for example, shorter than the height H1 of the long-side outer terminal 16 in the insertion direction (Z-axis direction).

In the short-side outer terminal 15, the short-side lower part 15*a* connected to the ground electrode 4 has the lowest electric potential, and an electric potential to a high frequency is higher at the short-side inner part 15*b* than at the short-side lower part 15*a*. By such difference in the electric potential, an electric field from the short-side inner part 15*b* toward the short-side lower part 15*a* is caused in the short-side outer terminal 15. The direction of the electric field caused in the short-side outer terminal 15 obliquely intersects with the direction of the high-frequency radiation noise from the short-side inner terminal 13. On the other hand, from the short-side inner terminal 13, a high-frequency radiation noise is radiated from an inner side portion toward an outer side portion. Therefore, although the electric field caused in the short-side outer terminal 15 includes a component which matches the direction of the high-frequency radiation noise from the short-side inner terminal 13, the component of the electric field which matches the direction of the high-frequency radiation noise is merely a portion of the electric field caused in the short-side outer terminal 15. Furthermore, by a length of the terminal from the short-side lower part 15*a* to the end portion of the short-side inner part 15*b* being shorter, the difference in the electric potential itself becomes smaller. Thus, the high-frequency radiation noise from the short-side inner terminal 13 can be suppressed.

Similarly, in the long-side outer terminal 16, the long-side lower part 16*a* connected to the ground electrode 4 has the lowest electric potential, and an electric potential to a high frequency is higher at the long-side inner part 16*b* than at the long-side lower part 16*a*. By such difference in the electric potential, an electric field from the long-side inner part 16*b* toward the long-side lower part 16*a* is caused in the long-side outer terminal 16. The direction of the electric field caused in the long-side outer terminal 16 obliquely intersects with the direction of the high-frequency radiation noise from the long-side inner terminal 12. On the other hand, from the long-side inner terminal 12, a high-frequency radiation noise is radiated from an inner side portion toward an outer side portion. Therefore, although the electric field caused in the long-side outer terminal 16 includes a component which matches the direction of the high-frequency radiation noise from the long-side inner terminal 12, the component of the electric field which matches the direction of the high-frequency radiation noise is merely a portion of the electric field caused in the long-side outer terminal 16. Furthermore, by a length of the terminal from the long-side lower part 16*a* to the end portion of the long-side inner part 16*b* being shorter, the difference in the electric potential itself becomes smaller. Thus, the high-frequency radiation noise from the long-side inner terminal 12 can be suppressed.

Therefore, when the outer terminals 15 and 16 have the first parts 15*a* and 16*a* and the inner parts 15*b* and 16*b*, the component of the electric field which matches the direction of the high-frequency radiation noise is merely a portion of the electric field caused in each of the outer terminals 15 and 16. Moreover, by the lengths of the terminals from the first parts 15*a* and 16*a* to the end portions of the inner parts 15*b* and 16*b* being shorter, the difference in the electric potential becomes smaller. Thus, the high-frequency radiation noise from the inner terminals 12 and 13 can be suppressed.

Although the concrete embodiments of the present disclosure are described, the present disclosure is not limited to the above embodiments, and may be embodied while being changed variously within a scope of the present disclosure.

Although, in the above embodiment, the slit 16*m* is provided to the long-side outer terminal 16, the slit 16*m* may be provided to the short-side outer terminal 15. In this case, the slit 16*m* is disposed to face the transversal middle part 11*d* (holding member 11) holding the short-side inner terminal 13. When a plurality of inner terminals 13 are provided to the transversal middle part 11*d* (holding member 11), for example, the position of the slit 16*m* is in front of the transversal middle part 11*d* (holding member 11) located between the inner terminals 13. Therefore, leakage of the high-frequency radiation noise from the short-side inner terminal 13 through the slit 16*m* can be suppressed. Moreover, for example, a plurality of slits 16*m* may be provided to the short-side outer terminal 15 to be located separately from each other in the short-side direction (Y-axis direction). Therefore, an amount of elastic deformation of the short-side outer terminal 15 can be adjusted.

Although, in the above embodiment, the slit 16*m* is provided to the long-side upper part 16*c*, the slit 16*m* may also be formed to extend to the inner parts 15*b* and 16*b* and/or the outer parts 15*d* and 16*d* of the outer terminals 15 and 16. Therefore, an amount(s) of elastic deformation of the short-side outer terminal 15 and/or the long-side outer terminal 16 can be adjusted.

In the above embodiments, the short-side outer terminal 15 has at least the short-side lower part 15*a* and the short-side inner part 15*b*, and the long-side outer terminal 16 has at least the long-side lower part 16*a* and the long-side inner part 16*b*. However, one of the short-side outer terminal 15 and the long-side outer terminal 16 may have at least the first part and the inner part. For example, when a signal at a frequency higher than a signal which flows in the long-side inner terminal 12 flows in the short-side inner terminal 13, the short-side outer terminal 15 opposed to the short-side inner terminal 13 may have at least the short-side first part 15*a* and the short-side inner part 15*b*, and the long-side outer terminal 16 may have the configuration as described in the related art (that is, the configuration in which the electric field from the inner part toward the outer part is caused). Therefore, a further high-frequency radiation noise from the short-side inner terminal 13 can be suppressed.

In the above embodiments, the outer terminal is separated into the two short-side outer terminals 15 and the two long-side outer terminals 16. However, the outer terminal may have a configuration in which the short-side outer terminal 15 and the long-side outer terminal 16 located next to each other are coupled together with a coupling part interposed therebetween. For example, the outer terminal may have a configuration including two coupled terminals, each coupled terminal being configured by the short-side outer terminal 15 and the long-side outer terminal 16 being coupled together. Alternatively, the outer terminal may have a configuration including a coupled terminal where the short-side outer terminal 15, the long-side outer terminal 16, and another short-side outer terminal 15 are coupled together, and another long-side outer terminal 16. Alternatively, the outer terminal may have a configuration including a coupled terminal where the long-side outer terminal 16, the short-side outer terminal 15, and another long-side outer terminal 16 are coupled together, and another short-side outer terminal 15. Alternatively, the outer terminal may have a configuration in which the short-side outer terminal 15, the long-side outer terminal 16, another short-side outer terminal 15, and another long-side outer terminal 16 are coupled together. Therefore, the number of components can be reduced.

The present disclosure and the embodiments can be summarized as follows.

The electrical connector 10 according to one aspect of the present disclosure includes the inner terminal 12, 13; the outer terminal 15, 16 surrounding the inner terminal 12, 13; and the holding member 11 that has electrically insulating properties, extends in the long-side direction and the short-side direction, and is configured to hold the inner terminal 12, 13 and the outer terminal 15, 16. The holding member 11 has the first surface 11*m* located on the first side that is the side facing the mounting circuit board 3, the second surface 11*n* located on the second side opposite from the first side, and the inner side surface 11*s* and the outer side surface 11*t* connecting the first surface 11*m* to the second surface 11*n*, and the outer terminal 15, 16 includes the first part 15*a*, 16*a* extending along the first surface 11*m*, and the inner part 15*b*, 16*b* connected to the first part 15*a*, 16*a* and extending along the inner side surface 11*s*.

In this configuration, at least an electric field which promotes the high-frequency radiation noise is not caused from the outer terminal 15, 16. Therefore, the high-frequency radiation noise from the inner terminal 12, 13 can be suppressed.

Moreover, in the electrical connector 10 of one embodiment, the outer terminal 15, 16 further includes the second part 15*c*, 16*c* connected to the inner part 15*b*, 16*b* and extending along the second surface 11*n*.

In this embodiment, the electric field which promotes the high-frequency radiation noise is not caused from the outer terminal 15, 16. Therefore, the high-frequency radiation noise from the inner terminal 12, 13 can be suppressed.

Moreover, in the electrical connector 10 of one embodiment, the outer terminal 15, 16 further includes the outer part 15*d*, 16*d* connected to the second part 15*c*, 16*c* and extending along the outer side surface 11*t*.

In this embodiment, the direction of the electric field caused in the outer terminal 15, 16 is opposite from the direction of the high-frequency radiation noise from the inner terminal 12, 13. Therefore, the high-frequency radiation noise from the inner terminal 12, 13 can be suppressed.

Moreover, in the electrical connector 10 of one embodiment, the outer terminal 15, 16 includes the short-side outer terminal 15 extending in the short-side direction, and the long-side outer terminal 16 extending in the long-side direction, and the short-side outer terminal 15 and the long-side outer terminal 16 are separate from each other.

In this embodiment, an amount of elastic deformation of each of the short-side outer terminal 15 and the long-side outer terminal 16 can be adjusted separately.

Moreover, in the electrical connector 10 of one embodiment, the inner terminal 12, 13 includes the plurality of long-side inner terminals 12 aligned in the long-side direction, and the short-side inner terminal 13 disposed in the short-side direction, A signal at a frequency higher than a signal which flows in the plurality of long-side inner terminals 12 flows in the short-side inner terminal 13, and the short-side distance D1 between the short-side inner terminal 13 and the short-side outer terminal 15 is shorter than the long-side distance D2 between the plurality of long-side inner terminals 12 and the long-side outer terminal 16.

In this embodiment, the high-frequency radiation noise from the short-side inner terminal 13 can easily be suppressed.

Moreover, in the electrical connector 10 of one embodiment, the slit 16*m* is provided to the second part 16*c* of the outer terminal 16, the slit 16*m* extending to connect the inner part 16*b* and the outer part 16*d*.

In this embodiment, an amount of elastic deformation of the long-side outer terminal 16 can be adjusted.

Moreover, in the electrical connector 10 of one embodiment, the outer terminal includes the short-side outer terminal 15 extending in the short-side direction, and the long-side outer terminal 16 extending in the long-side direction, and the slit 16*m* is provided to the long-side outer terminal 16.

In this embodiment, an amount of elastic deformation of the long-side outer terminal 16 can be adjusted.

Moreover, in the electrical connector 10 of one embodiment, the position of the slit 16*m* is the position facing the holding member 11 configured to hold the inner terminal 12, 13.

In this embodiment, leakage of the high-frequency radiation noise from the inner terminal 12, 13 through the slit 16*m* can be suppressed.

Moreover, in the electrical connector 10 of one embodiment, the position of the slit 16*m* is the position in front of the holding member 11 located between the inner terminals 12; 13.

In this embodiment, leakage of the high-frequency radiation noise from the inner terminal 12, 13 through the slit 16*m* can be suppressed.

Moreover, in the electrical connector 10 of one embodiment, the height of the outer terminal 15, 16 is higher than the height of the inner terminal 12, 13.

In this embodiment, the high-frequency radiation noise from the inner terminal 12, 13 can easily be suppressed, and the inner terminal 12, 13 is protected.

The electrical connector set 1 according to one aspect of the present disclosure includes the electrical connector 10 described above, and the opposing electrical connector 20 configured to be insertably and removably mated with the electrical connector 10 in the insertion direction.

In this configuration, at least an electric field which promotes the high-frequency radiation noise is not caused from the outer terminal 15, 16. Therefore, the electrical connector set 1 capable of suppressing the high-frequency radiation noise from the inner terminal 12, 13 can be provided.

Moreover, in the electrical connector set 1 of one embodiment, the protruding part 26*g* configured to be mated with the recess 16*g* provided to the inner side surface 11*s* of the electrical connector 10 is provided.

In this configuration, the mated state of the electrical connector set 1 can stably be maintained.

What is claimed is:

1. An electrical connector comprising:

an inner terminal;

an outer terminal surrounding the inner terminal; and a holding member that has electrically insulating properties, the holding member having two long-side beam parts that each extend in a long-side direction and two short-side beam parts that each extend in a short-side direction between respective ends of the long-side beam parts, and is configured to hold the inner terminal and the outer terminal, wherein the holding member has a first surface located on a first side that is a side facing a mounting circuit board, a second surface located on a second side opposite from the first side, and an inner side surface and an outer side surface connecting the first surface to the second surface, the outer terminal includes a long-side outer terminal extending in the long-side direction along one of the long-side beam parts from a position proximate to one of the short-side beam parts to a position proximate to an other of the short-side beam parts, and the outer terminal includes a first part extending along and in contact with the first surface, and an inner part connected to the first part and extending along and in contact with the inner side surface.

2. The electrical connector according to claim 1, wherein the outer terminal further includes a second part connected to the inner part and extending along the second surface.

3. The electrical connector according to claim 2, wherein the outer terminal further includes an outer part connected to the second part and extending along the outer side surface.

4. The electrical connector according to claim 1, wherein the outer terminal further includes a short-side outer terminal extending in the short-side direction, and the short-side outer terminal and the long-side outer terminal are separate from each other.

5. The electrical connector according to claim 4, wherein the inner terminal includes a long-side inner terminal aligned in the long-side direction, and a short-side inner terminal disposed in the short-side direction, configured such that a signal at a frequency higher than a signal which flows in the long-side inner terminal flows in the short-side inner terminal, and a short-side distance between the short-side inner terminal and the short-side outer terminal is shorter than a long-side distance between the long-side inner terminal and the long-side outer terminal.

6. The electrical connector according to claim 3, wherein the second part of the outer terminal includes a slit extending to connect the inner part and the outer part.

7. The electrical connector according to claim 6, wherein the outer terminal further includes a short-side outer terminal extending in the short-side direction, and the long-side outer terminal includes the slit.

8. The electrical connector according to claim 6, wherein the slit is positioned facing the holding member configured to hold the inner terminal.

9. The electrical connector according to claim 8, wherein the slit is positioned in front of the holding member located between inner terminals, each of which being the inner terminal included in the electrical connector.

10. The electrical connector according to claim 1, wherein a height of the outer terminal is higher than a height of the inner terminal.

11. An electrical connector set comprising:

the electrical connector according to claim 1; and an opposing electrical connector configured to insertably and removably mate with the electrical connector in an insertion direction.

12. The electrical connector set according to claim 11, wherein the opposing electrical connector has a protruding part configured to mate with a recess in the inner side surface of the electrical connector.

13. The electrical connector according to claim 2, wherein the outer terminal further includes a short-side outer terminal extending in the short-side direction, and the short-side outer terminal and the long-side outer terminal are separate from each other.

14. The electrical connector according to claim 3, wherein the outer terminal further includes a short-side outer terminal extending in the short-side direction, and the short-side outer terminal and the long-side outer terminal are separate from each other.

15. The electrical connector according to claim 7, wherein the slit is positioned facing the holding member configured to hold the inner terminal.

16. The electrical connector according to claim 2, wherein a height of the outer terminal is higher than a height of the inner terminal.

17. The electrical connector according to claim 3, wherein a height of the outer terminal is higher than a height of the inner terminal.

18. The electrical connector according to claim 4, wherein a height of the outer terminal is higher than a height of the inner terminal.

19. An electrical connector set comprising:

the electrical connector according to claim 2; and an opposing electrical connector configured to insertably and removably mate with the electrical connector in an insertion direction.

20. An electrical connector set comprising:

the electrical connector according to claim 3; and an opposing electrical connector configured to insertably and removably mate with the electrical connector in an insertion direction.

* * * * *